(12) United States Patent
Phang et al.

(10) Patent No.: US 9,619,019 B2
(45) Date of Patent: Apr. 11, 2017

(54) DISPLAY APPARATUS WITH A PLURALITY OF SCREENS AND METHOD OF CONTROLLING THE SAME

(71) Applicant: SAMSUNG ELECTRONICS CO., LTD., Suwon-si (KR)

(72) Inventors: Joon-ho Phang, Seoul (KR); Nam-hyun Park, Suwon-si (KR); Do-sung Jung, Seoul (KR); Joo-sun Moon, Seoul (KR); Yi-sak Park, Seoul (KR); Sue-young Chung, Seoul (KR); Christopher E. Bangle, Clavesana (IT)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 288 days.

(21) Appl. No.: 14/275,082

(22) Filed: May 12, 2014

(65) Prior Publication Data

US 2014/0333531 A1    Nov. 13, 2014

(30) Foreign Application Priority Data

May 10, 2013    (KR) .................. 10-2013-0053401

(51) Int. Cl.
*G06F 3/01*    (2006.01)
*H04N 21/422*    (2011.01)
(Continued)

(52) U.S. Cl.
CPC .............. *G06F 3/012* (2013.01); *G06F 3/017* (2013.01); *H04N 21/4223* (2013.01);
(Continued)

(58) Field of Classification Search
CPC ... G06F 3/017; G06F 3/012; H04N 21/42203; H04N 21/4316; H04N 21/4438; H04N 21/4852
See application file for complete search history.

(56) References Cited

U.S. PATENT DOCUMENTS 5,796,843 A    8/1998    Inanaga et al.
6,002,403 A    12/1999    Sugiyama et al.
(Continued)

FOREIGN PATENT DOCUMENTS

JP        5-130550 A        5/1993
KR    10-2001-0100342 A    11/2001
(Continued)

OTHER PUBLICATIONS

International Search Report, Issued by the International Searching Authority, Dated Aug. 26, 2014, in counterpart International application No. PCT/KR2014/004134.
(Continued)

*Primary Examiner* — Abbas Abdulselam
(74) *Attorney, Agent, or Firm* — Sughrue Mion, PLLC

(57) ABSTRACT

A display apparatus and a control method thereof are provided. The display apparatus includes a display configured to display a plurality of images received from a plurality of sources on each of a first screen, a second screen, and a third screen of a display screen, a user interface configured to detect a user interaction, and a controller configured to control the display to move locations of the first to third screens in accordance with a detected rotation interaction in response to the rotation interaction being detected through the user interface.

36 Claims, 28 Drawing Sheets

(51) Int. Cl.
  *H04N 21/4223* (2011.01)
  *H04N 21/431* (2011.01)
  *H04N 21/4402* (2011.01)
  *H04N 21/442* (2011.01)
  *H04N 21/443* (2011.01)
  *H04N 21/462* (2011.01)
  *H04N 21/485* (2011.01)

(52) U.S. Cl.
  CPC . *H04N 21/42203* (2013.01); *H04N 21/42222* (2013.01); *H04N 21/4316* (2013.01); *H04N 21/4438* (2013.01); *H04N 21/44218* (2013.01); *H04N 21/440263* (2013.01); *H04N 21/4622* (2013.01); *H04N 21/4852* (2013.01); *H04N 21/4858* (2013.01)

(56) References Cited

U.S. PATENT DOCUMENTS

| | | | |
|---|---|---|---|
| 7,743,342 B2 | 6/2010 | Nishijima | |
| 8,060,826 B2 | 11/2011 | Park | |
| 8,115,869 B2 | 2/2012 | Rathod et al. | |
| 8,117,563 B2 | 2/2012 | Ok et al. | |
| 8,195,220 B2 | 6/2012 | Kim et al. | |
| 8,340,908 B2 * | 12/2012 | Hess | A63F 13/02 701/505 |
| 8,423,076 B2 | 4/2013 | Kim et al. | |
| 9,261,957 B2 | 2/2016 | Kim et al. | |
| 9,298,254 B2 * | 3/2016 | Ha | G06F 3/01 |
| 9,465,437 B2 | 10/2016 | Kim et al. | |
| 2006/0181688 A1 | 8/2006 | Hoshino et al. | |
| 2006/0190965 A1 | 8/2006 | Lin et al. | |
| 2009/0197615 A1 | 8/2009 | Kim et al. | |
| 2009/0197635 A1 | 8/2009 | Kim et al. | |
| 2011/0131502 A1 | 6/2011 | Ryu et al. | |
| 2012/0086680 A1 | 4/2012 | Ueda | |
| 2013/0162516 A1 * | 6/2013 | Paretti | G06F 3/0488 345/156 |
| 2013/0326557 A1 | 12/2013 | Kang et al. | |
| 2014/0210705 A1 * | 7/2014 | Kim | G06F 3/012 345/156 |
| 2016/0179191 A1 | 6/2016 | Kim et al. | |

FOREIGN PATENT DOCUMENTS

| | | |
|---|---|---|
| KR | 10-2006-0013605 A | 2/2006 |
| KR | 10-2008-0064025 A | 7/2008 |
| KR | 10-2008-0079501 A | 9/2008 |
| KR | 10-2009-0113801 A | 11/2009 |
| KR | 10-2010-0010073 A | 2/2010 |
| KR | 10-2010-0081429 A | 7/2010 |
| KR | 10-2010-0122432 A | 11/2010 |
| KR | 10-2011-0012524 A | 2/2011 |
| KR | 10-2011-0038595 A | 4/2011 |
| KR | 10-2011-0061187 A | 6/2011 |
| KR | 10-2012-0074452 A | 7/2012 |
| KR | 10-1180119 B1 | 9/2012 |
| WO | 01/84461 A1 | 11/2001 |
| WO | 2013/022486 A1 | 2/2013 |

OTHER PUBLICATIONS

Written Opinion, Issued by the International Searching Authority, Dated Aug. 26, 2014, in counterpart International application No. PCT/KR2014/004134.

Communication dated Nov. 7, 2016, issued by the European Patent Office in counterpart European application No. 14794444.1.

* cited by examiner

DISPLAY APPARATUS WITH A PLURALITY OF SCREENS AND METHOD OF CONTROLLING THE SAME

CROSS-REFERENCE TO RELATED APPLICATIONS

This application claims priority from Korean Patent Application No. 10-2013-0053401, filed on May 10, 2013, in the Korean Intellectual Property Office, the disclosure of which is incorporated herein by reference, in its entirety.

BACKGROUND

Technical Field

Apparatuses and methods consistent with the exemplary embodiments relate to a display apparatus and a method of controlling the same. More specifically, apparatuses and methods consistent with the exemplary embodiments relate to a display apparatus in which a plurality of screens are displayed in a display screen, and a method of controlling the same.

Description of the Related Art

According to an increase of content and user needs, a display apparatus receives content from a variety of sources and provides a user with a variety of pieces of content. As the amount of content provided to the display apparatus increases, the display apparatus needs to provide a plurality of screens in order to search for a piece of content from among lots of content.

A display apparatus in the related art provided a main screen and an additional screen such as a picture-in-picture (PIP) screen, using a plurality of screens. However, since the main screen is obstructed by the PIP screen, which is the additional screen, in the display apparatus in the related art, it is not easy for a user to view the main screen and the PIP screen.

Further, the display apparatus in the related art may not move the PIP screen, if ever, and may only display the PIP in a location specified by the user. In addition, the display apparatus in the related art has a difficulty of individually controlling the main screen and the PIP screen.

That is, it is necessary to find a method of more intuitively controlling the plurality of screens displayed on a display apparatus.

SUMMARY

Exemplary embodiments of the overcome the above disadvantages and other disadvantages not described above. In addition, the exemplary embodiments are not required to overcome the disadvantages described above, and an exemplary embodiment may not overcome any of the problems described above.

The exemplary embodiments provide a display apparatus configured to move a plurality of screens displayed in a display screen according to a user interaction, and more intuitively select content the user would like to watch among the plurality of screens, and a method of controlling the same.

A display apparatus according to an exemplary embodiment includes a display configured to display a plurality of images received from a plurality of sources on each of a first screen, a second screen, and a third screen of a display screen, a user interface configured to detect a user interaction, and a controller configured to control the display to move locations of the first to third screens in accordance with a detected rotation interaction in response to the rotation interaction being detected through the user interface.

The display may be configured to place one of the first to third screens on a center of the display, wherein at least two screens among the first to third screens have a different viewing angle.

In response to the rotation interaction being a user's head rotation interaction, the controller may control the display by detecting the user's head rotation, in order to move the first to third screens in accordance with a direction of the user's detected head rotation.

The controller may control the display to increase a ratio of the third screen on the display which is located on a right side among the first to third screens by moving the first to third screens in a left direction in response to a detection that the user's head rotates in a right direction through the user interface, and in response to a detection that the user's head rotates in a left direction through the user interface, increase a ratio of the first screen on the display which is located on a left side among the first to third screens by moving the first to third screens in a right direction.

The controller may move the first to third screens on a real-time basis in accordance with the user's detected head rotation angle.

The controller, in response to a detection that the user's head rotation angle is higher than a pre-determined value while the user's head moves in a right direction, may set the third screen which is moved in a left direction as a main screen, and in response to a detection that the user's head rotation angle is higher than a pre-determined value while the user's head moves in a left direction, may set the first screen which is moved in a right direction as a main screen.

The apparatus may further include an audio output configured to output an audio on at least one screen among the first to third screens, wherein, the controller controls the audio output to change an audio output of at least one screen among the first to third screens in accordance with the detected rotation interaction.

The controller may control the audio output to output only an audio of content displayed on a main screen which occupies a largest ratio of the display, among the first to third screens.

In response to the user rotation interaction being a user's head rotation interaction, the audio controller may control the audio output to increase an audio output of content displayed on a screen whose ratio on the display is increasing in response to the user's head rotation being detected through the user interface.

The controller may be configured to increase an audio output of content displayed on the third screen located on a right side among the first to third screens in response to a detection that the user's head rotates in a right direction through the user interface, and the controller may increase an audio output of content displayed on the first screen located on a left side, among the first to third screens in response to a detection that the user's head rotates in a left direction through the user interface.

The controller may be configured to control the audio output to increase an audio output of a content displayed on a screen whose ratio of the display is increasing, among the first to third screens, in accordance with a screen ratio of the display.

The controller may be configured to control the audio output unit to set the third screen which is located on a right side as a new main screen and outputs only an audio of content displayed on the third screen in response to a detection that the user's head rotation angle is higher than a pre-determined value while the user's head moves in a right direction, the controller may be configured to set the first screen which is located on a left side as a new main screen and output only an audio of content displayed on the first screen in response to a detection that the user's head rotation angle is higher than a pre-determined value while the user's head moves in a left direction.

In response to the rotation interaction being an interaction to rotate a remote controller after pressing a button in a remote controller, the controller may control the display to move a screen which corresponds to a rotation direction of the remote controller in a direction of a center of the display.

A method of controlling a display apparatus according to an exemplary embodiment includes displaying a plurality of images received from a plurality of sources on each of a first screen, a second screen, and a third screen of a display; detecting a rotation interaction; moving a location of the first to third screens to the display in accordance with the detected rotation interaction.

The displaying may include placing one of the first to third screens on a center of the display, and displaying the first to third screens so that at least two screens among the first to third screens have a different viewing angle.

The detecting may include detecting a user's head rotation interaction through the rotation interaction, wherein the moving comprises moving the first to third screens in accordance with a direction of the detected user's head rotation.

The moving may include increasing a ratio of the first screen on the display which is located on a left side among the first to third screens by moving the first to third screens in a right direction in response to a detection that the user's head rotates in a right direction, and increasing a ratio of the third screen on the display of the third screen which is located on a right side among the first to third screens by moving the first to third screens in a left direction in response to a detection that the user's head rotates in a left direction i.

The moving may include moving the first to third screens on a real-time basis in accordance with the user's head rotation angle being detected.

The moving may include determining the third screen which is moved in a left direction as a main screen in response to detection that the user's head rotation angle is higher than a pre-determined value while the user's head moves in a right direction, and determining the first screen which is moved in a right direction as a main screen in response to a detection that the user's head rotation angle is higher than a pre-determined value while the user's head moves in a left direction.

The method may include outputting an audio on at least one screen among the first to third screens, and changing an audio output of at least one screen among the first to third screens in accordance with the detected rotation interaction.

The changing may include outputting an audio of content displayed on a main screen which takes up a largest ratio of the display, among the first to third screens.

The detecting may include detecting a user's head rotation interaction with the rotation interaction, wherein the changing comprises increasing an audio output of a content displayed on a screen whose ratio of the display screen is increasing in accordance with a direction of the detected user's head rotation, among the first to third screens.

The changing may include increasing an audio output of content displayed on a third screen located on a right side among the first to third screens in response to a detection that the user's head is rotated in a right direction, increasing an audio output of content displayed on a third screen located on a right side among the first to third screens in response to a detection that the user's head is rotated in a left direction increasing an audio output of content displayed on a third screen located on a right side among the first to third screens.

The changing may include increasing an audio output of content displayed on a screen whose ratio of the display screen is increasing in accordance with a ratio of the display screen, among the first to third screens.

The changing may include determining a third screen located on a right side among the first to third screens as a new main screen in response to a detection that the user's head rotation angle is higher than a pre-determined value while the user's head moves in a right direction, and outputting an audio of content displayed on the third screen in response to a detection that the user's head rotation angle is higher than a pre-determined value while the user's head moves in a left direction, determining a first screen located on a left side among the first to third screens as a new main screen, and may output an audio of content displayed on the first screen.

The detecting may include detecting a user interaction which rotates a remote controller after pressing a button in a remote controller by the rotation interaction, wherein the moving may include moving a screen which corresponds to a direction of a rotation of the remote controller in a direction of a center of the display.

In an aspect of an exemplary embodiment a user interaction may include a user's eye movement interaction in which a movement of the user's eye is detected.

The display apparatus may include a storage configured to store a plurality of modules for operating the display apparatus.

The modules may include at least one of a voice recognition module, a touch recognition module and a gesture module.

The controller may be configured to control the display to display information related to the video content played on the first to third screens.

Additional and/or other aspects and advantages of the invention will be set forth in part in the description which follows and, in part, will be obvious from the description, or may be learned by practice of the exemplary embodiments.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Figure 1:
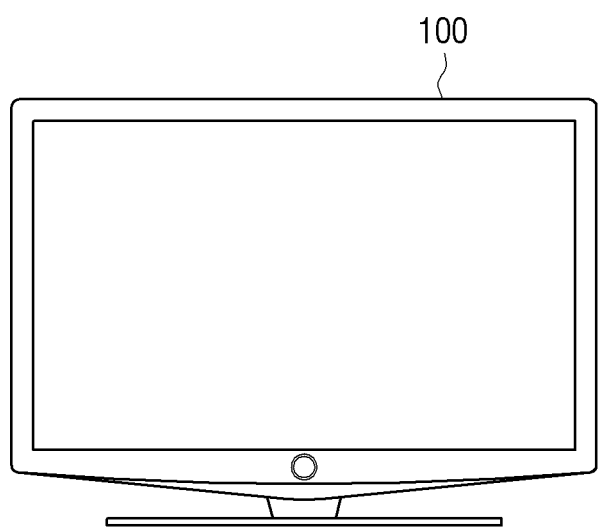
FIG. 1 is a diagram which illustrates a display system according to an exemplary embodiment.
Figure 1:
Figure 1:
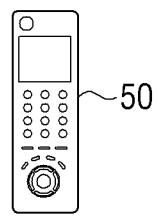

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. In addition, well-known functions or constructions are not described in detail since they would obscure the exemplary embodiments with unnecessary detail.

FIG. 1 is a diagram illustrating a display system according to an exemplary embodiment. Referring to FIG. 1, a display system 10 according to an exemplary embodiment may include a display apparatus 100 and a remote controller 50.

The display apparatus 100 may be embodied as a digital TV as shown in FIG. 1. However, the exemplary embodiments are not limited thereto, and implemented as various types of apparatuses including a display function, such as a PC, a mobile phone, a tablet, a PMP, a PDA, and a navigation device. In response to the display apparatus 100 being implemented as a portable device, the display apparatus 100 may have a touch screen to execute a program using a finger or a pen (e.g., a stylus pen). However, for easier description, the exemplary embodiments will be described hereinafter, assuming that the display apparatus 100 is implemented as a digital TV.

In response to the display apparatus 100 being embodied as a digital TV, the display apparatus 100 may be controlled by the remote controller 50. In this case, the remote controller 50 may be an apparatus configured to remotely control the display apparatus 100, receive a user command, and transmit a control signal which corresponds to the received user command to the display apparatus 100. The remote controller 50 may be implemented in various forms. For example, the remote controller 50 may detect a motion of the remote controller 50 and transmit a signal which corresponds to the detected motion, recognize a voice and transmit a signal which corresponds to the recognized voice, or transmit a signal which corresponds to an input key, etc.

In particular, the display apparatus 100 may display a plurality of screens for playing a plurality of pieces of content in a single display screen according to a user command. Further, the display apparatus 100 may control a plurality of screens according to various types of user interactions. Hereinafter, various exemplary embodiments will be described with reference to a block diagram showing a specific configuration of the display apparatus 100.

Figure 2:
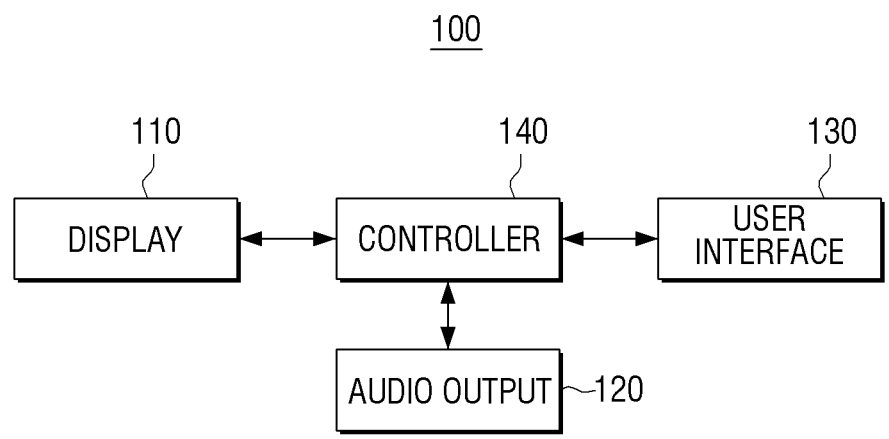
FIG. 2 is a block diagram schematically which illustrates a configuration of a display apparatus according to an exemplary embodiment.
Figure 3:
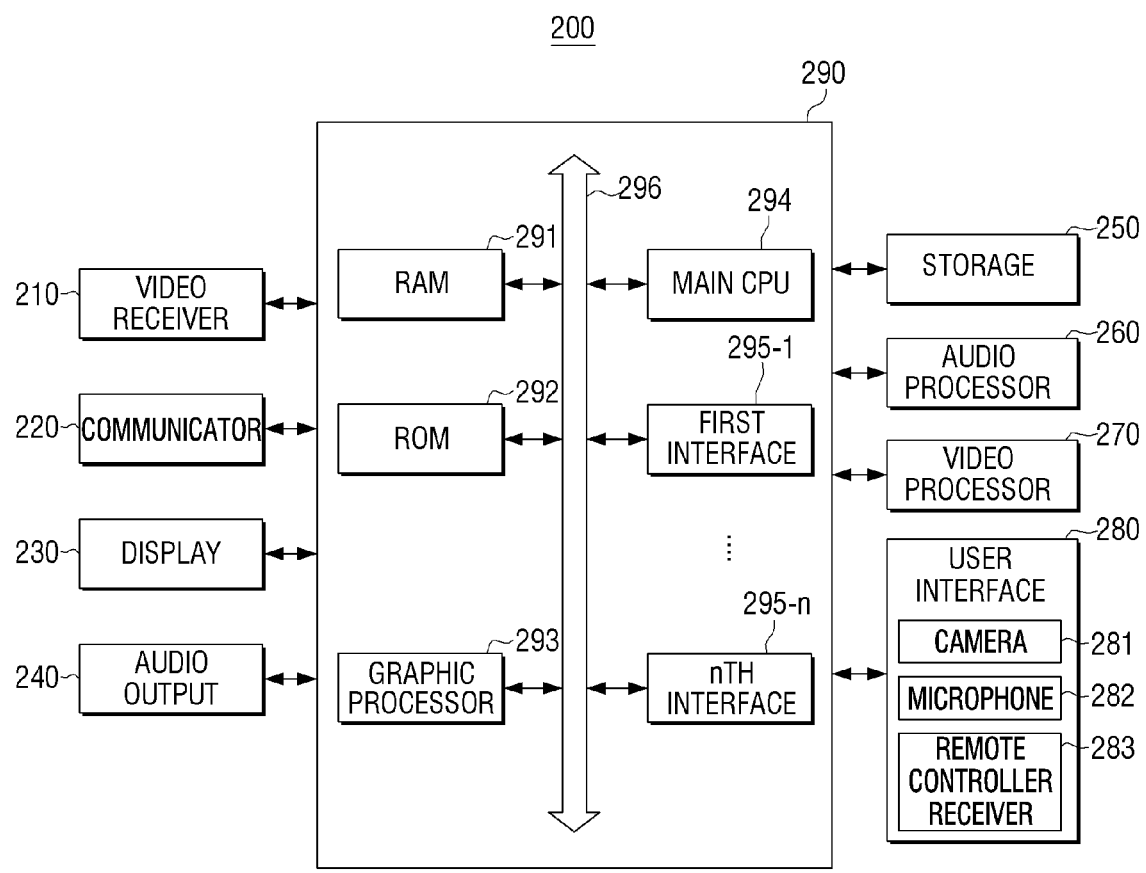
FIG. 3 is a block diagram which illustrates in detail a configuration of a display apparatus according to an exemplary embodiment.

FIGS. 2 and 3 are block diagrams showing a configuration of a display apparatus according to an exemplary embodiment.

Referring to FIG. 2, a display apparatus 100 includes a display 110, an audio output 120, a user interface 130, and a controller 140.

The display 110 outputs video data or a user interface (UI), which is received from the outside or is pre-stored, under the control of the controller 140. In particular, the display 110 may display a plurality of screens configured to play a plurality of pieces of content in a single display screen according to a preset user command. In this case, the plurality of screens can be overlapped in a preset shape (such as rectangle, trapezoid, etc.) or disposed separately on one display screen. In particular, the plurality of screens can be disposed to have a different viewing angle, and in response to a user's viewing angle changing, location of the plurality of screens can move in accordance with the changed viewing angle. In this case, a 2D image can be displayed on each of the plurality of screens, but this is merely exemplary, and a 3D image can be displayed on each of the plurality of screens.

According to an exemplary embodiment, the display 110 may display a first screen, a second screen, and a third screen. In this case, the second screen may occupy the largest ratio in the center of the display screen, the first screen may be displayed in a left side of the second screen, and the third screen may be displayed in a right side of the second screen. In this case, the first screen and the third screen may have a trapezoid shape, and therefore a different viewing angle from the second screen. As described above, since the first screen and the third screen have trapezoid shapes to the left and right of the second screen and have different viewing angles, a user may obtain an effect as if he/she were viewing the first to third screens in a three dimensional space. However, this is only an exemplary embodiment, and a plurality of screens may be displayed in a top-and-bottom direction or a diagonal direction with the second screen disposed in the center area. Hereinafter, for convenience in explanation, exemplary embodiments will be described assuming that the second screen is displayed in the center of the display screen, the first screen is displayed in the left side of the second screen, and the third screen is displayed in the right side of the second screen.

In particular, one of the first to third screens may be set as a main screen. The main screen may be a screen configured to display content which the user would like to mainly see, and occupying the largest ratio on the display screen among the plurality of screens. Specifically, an audio of the main screen may be output with the largest level in the display apparatus 100.

In addition, the screens except for the main screen among the first to third screens may be set as subscreens. The subscreen refers to a screen configured to display other pieces of content in addition to the main screen, and occupies a smaller ratio than the main screen on the display screen. In particular, the subscreen may display a part of a screen in which a piece of content is being played. In addition, an audio of the subscreen may not be output, or may be output with a level of a predetermined value or less depending on the ratio of the subscreen on the display screen.

In addition, the main screen and the subscreen may travel depending on a preset user interaction, and may change at least one of their location, size, and form. Further, the main screen and the subscreen may be interchanged with each other. A detailed description thereof will be given below.

The display 110 may be embodied as a liquid crystal display panel (LCD), an organic light emitting diodes (OLED), etc., but is not limited thereto. Further, the display 110 may be embodied as a flexible display, a transparent display, etc., in some cases.

The audio output 120 may output an audio related to at least one of the plurality of screens. In particular, the audio output 120 may output only the audio of the main screen among the plurality of screens. In addition, in response to the plurality of screens moving according to the user interaction, the audio output 120 may change an audio output of at least one screen among the plurality of screens. A detailed description thereof will be given below.

The user interface 130 may detect various user interactions. In particular, the user interface 130 may detect a user interaction for controlling the plurality of screens. Specifically, the user interface 130 may detect various user interactions such as a user interaction for moving the plurality of screens, a user interaction for changing the main screen, and a user interaction for selecting content which is played in a screen among the plurality of screens. For example, the user interface 130 may detect at least one of the user's head rotation and head movement, transmit the detected signal to the controller 140, which will be described later, and move and display the plurality of screens.

The user interface 130 may be embodied in various forms in accordance with exemplary embodiments of the display apparatus 100. When the display apparatus 100 is embodied as a digital TV, the user interface 130 may be embodied as a remote controller receiver which receives a remote control signal from a remote controller 50, a camera which detects a user's motion, a microphone which receives a user's voice, etc. In addition, in response to the display apparatus 100 being embodied as a mobile terminal, the user interface 130 may be embodied in the form of a touchscreen which forms a mutual layered structure with a touchpad. In this case, the user interface 130 may be used as the above described display 110.

The controller 140 may control the overall operation of the display apparatus 100. In particular, in response to the preset user interaction being detected through the user interface 130, the controller 140 may control the display 110 to move the first to third screens according to the preset user interaction. In addition, the controller 140 may control the audio output 120 to change the audio output of at least one of the first to third screens in order to correspond to the movement of the plurality of screens.

In an exemplary embodiment, in response to the preset user interaction being the user's head rotation interaction, the controller 140 may detect the user's head rotation, and control the display 110 to move the first to third screens according to the direction of the detected user's head rotation. Specifically, the controller 140 may determine a screen the user would like to view by detecting the direction of the user's head rotation, and increase a ratio of the screen the user would like to view on the display screen. For example, in response to a detection through the user interface 130 that the user's head rotates in a right direction, the controller 140 may control the display 110 in such a way that the first to third screens moves in a left direction to increase the ratio of the third screen, which is located on a right side, in the display screen. In addition, in response to a detection through the user interface 130 that the user's head rotates in the left direction, the controller 140 may control the display 110 to increase the ratio of the first screen, which is located on a left side on the display screen by moving the first to third screens to the right.

In addition, the controller 140 may determine the amount of the movement of the first to third screens in accordance with a rotation angle of the user's head, and move the first to third screens on a real-time basis. That is, the controller 140 may detect the user's head rotation on a real-time basis, and move the first to third screens on a real-time basis in accordance with the rotation angle of the user's head. Accordingly, since the user can move the screen in accordance with a direction at which he/she looks, the user may more intuitively select a screen to see content.

In addition, the controller 140 may set the subscreen to be a new main screen in response to the rotation angle of a user's head being detected as being greater than a preset value. Specifically, in response to the rotation angle of the user' head being detected as being greater than the preset value while the user's head moves in the right direction, the controller 140 may set the third screen which was set as the subscreen, to be the new main screen. That is, in response to the rotation angle of the user' head being detected as being greater than the preset value while the user's head moves to the right, the third screen newly set as a main screen may occupy the largest ratio on the display screen, and thereby an audio of the third screen may be output from the display apparatus 100. In addition, in response to the rotation angle of the user' head being detected as being greater than the preset value while the user's head moves to the left, the controller 140 may set the first screen which was set as the subscreen, to be a new main screen. That is, in response to the rotation angle of the user' head being detected as being greater than the preset value while the user's head moves to the left, the first screen newly set as a main screen may occupy the largest ratio on the display screen, and thereby an audio of the first screen may be output from the display apparatus 100.

In other exemplary embodiments, the preset user interaction is a user's touch interaction with respect to a touchscreen, the controller 140 may control the display 110 to move the first to third screens in accordance with a direction of the detected touch interaction. Specifically, the controller 140 may increase the ratio of the screen the user would like to view on the display screen in accordance with the direction of the detected touch interaction. For example, in response to the direction of the touch interaction detected by the touchscreen being in the right direction, the controller 140 may control the display 110 to move the first to third screens to the left, and thereby increase the ratio of the third screen located on the right on the display screen. In addition, the direction of the touch interaction detected by the touchscreen is in the left direction, the controller 140 may control the display 110 to move the first to third screens to the right, and thereby increase the ratio of the first screen located on the left on the display screen.

That is, as above described, since the user moves the plurality of screens by detecting the user's head rotation interaction or touch interaction, which is a directional user interaction, the user may more intuitively select a screen the user would like to view among the plurality of screens, in order to watch content.

As above described, although the directional user interaction is described as a user's head rotation interaction, this is only an exemplary embodiment, and the plurality of screens may be moved using another directional user interaction. For example, the first to third screens may be moved in accordance with a direction of a user interaction, using a user's eye movement interaction in which a movement of the user's eye is detected, a user's motion interaction in which a movement of the user's body (for example, a hand), a pointing device interaction in which a movement of the pointing device is detected, etc.

In still other exemplary embodiments, in response to the preset user interaction being a user interaction in which one of first to third buttons of a remote controller 50 respectively corresponding to first to third screens is selected, and one of the first to third buttons on the remote controller 50 is selected, the controller 140 may move the screen which corresponds to the selected button to the center area of the display screen to be set as a new main screen. Specifically, in response to the first button on the remote controller 50 being selected, the controller 140 may move the first screen which corresponds to the first button to the center area of the display screen to be set as a new main screen. In addition, in response to the third button on the remote controller 50 being selected, the controller 140 may move the third screen which corresponds to the third button to the center area of the display screen to be set as a new main screen.

That is, as above described, since the user moves the plurality of screens by the controller detecting a user interaction of directly selecting one of the plurality of screens, the user may more intuitively select a screen the user would like to view among the plurality of screens.

Meanwhile, as above described, although the interaction in which the user directly select one of a plurality of screens is described as an interaction of using a remote controller, this is only an example of an exemplary embodiment, and the plurality of screens may be moved using another user interaction. For example, the plurality of screens may be moved using a user's voice interaction in which one of the plurality of screens is directly selected using the user's voice, a pointer interaction in which one of the plurality of screens is directly selected using a pointer, etc.

Meanwhile, in response to the second screen being displayed as a main screen in the center area of the display screen, and the first and third screens are displayed respectively on the left and right sides of the second screen, the controller 140 may control the audio output 120 to output only the audio which corresponds to content displayed on the second screen. In addition, in response to the plurality of screens being moved in accordance with the preset user interaction, the controller 140 may control an output level of the audio in accordance with a ratio of the screen on the display screen.

In an exemplary embodiment, in response to a user's head rotation being detected through the user interface 130, the controller 140 may control the audio output 120 to decrease an audio output of content displayed on the main screen, and to increase an audio output of content displayed on a subscreen of which a ratio on the display screen increases in accordance with a detected direction of the user's head rotation. For example, in response to the user's head being detected as being rotated in the right direction, the controller 140 may decrease an audio output of content displayed on the second screen, and increase an audio output of content displayed on the third screen of which the ratio on the display screen is increasing. In addition, in response to the user's head being detected as being rotated in the left direction, the controller 140 may control the audio output 120 to decrease the audio output of the content displayed on the main screen, and to increase an audio output of content displayed on the first screen of which the ratio on the display screen is increasing.

In addition, the controller 140 may only output an audio of content played in the subscreen newly set as the main screen in response to one of the plurality of subscreens being set as a new main screen in accordance with a user interaction. For example the controller 140 may set the third screen as a new main screen, and output only an audio of content displayed on the third screen in response to the rotation angle of the user' head being detected as being greater than a preset value while the user's head moves in the right direction. In addition, the controller 140 may set the first screen, which is moved to the right direction, as a new main screen, and output only an audio of content displayed on the first screen in response to the rotation angle of the user' head being detected as being greater than a preset value while the user's head moves in the left direction.

In particular the controller 140 may remove an audio of content displayed on the previous main screen, and output only an audio of content played in the subscreen newly set as a main screen in response to one of the plurality of subscreens being set as a new main screen.

FIG. 3 is a block diagram which illustrates a configuration of a display apparatus in detail according to another exemplary embodiment. A display apparatus 200 according to another exemplary embodiment may include a video receiver 210, a communicator 220, a display 230, an audio output 240, a storage 250, an audio processor 260, a video processor 270, a user interface 280 and a controller 290.

The video receiver 210 may receive video data from a variety of sources. For example, the video receiver 210 may receive broadcast data from an external broadcast station, video data from an external apparatus (for example, a DVD or BD (Blu-ray Disc™) player), and video data stored in the storage 250. In particular, the video receiver 210 may equipped with a plurality of video receiver modules displaying a plurality of screens in a single display screen. For example, the video receiver 210 may include a plurality of tuners to display a plurality of broadcast channels at the same time.

The communicator 220 is a configuration of performing communication with various types of external apparatuses or external servers in accordance with various types of communication scheme. The communication unit 220 may include a variety of communication chip, such as a Wi-Fi chip, a Bluetooth® chip, a near-field-communication (NFC) chip, and a wireless communication chip. In this case, the WiFi chip, the Bluetooth® chip, the near-field-communication (NFC) chip may perform communication using a WiFi method, a Bluetooth® method, or an NFC method. Among these, the NFC chip may represent a chip operated by an NFC method in which a frequency band of 13.56 MHz is used among various RF-ID type frequency band, such as 135 kHz, 13.56 MHz, 433 MHz, 860~960 MHz, 2.45 GHz. When using the Wi-Fi chip or the Bluetooth® chip, the communicator 220 may transmit/receive a variety of connection information such as a source station identification (SSID) and a session key, connect communication using thereof, and then transmit/receive a variety of information. The wireless communication chip may refer to a chip to communicate in accordance with various communication standard, such as IEEE™, Zigbee®, third generation (3G), third generation partnership project (3GPP), long term evoloution (LTE).

The display 230 may display at least one of a video frame which is video data received by the video receiver 210 being processed in the video processor 270, and various screens generated in the graphic processor 293. In particular, the display 230 may display a plurality of screens playing a plurality of pieces of content in a single display screen in accordance with a preset user command. For example, the display 230 may display a second screen as a main screen on the center of the display screen, and trapezoidal first and third screen on left and right sides of the second screen.

The audio output 240 may be a configuration of outputting a variety of information sounds or voice message as well as a variety of audio data processed in the audio processor 260. In particular, although the audio output 240 is embodied as a speaker, this is only an example of the exemplary embodiment, and the audio output 240 may be embodied as another audio output such as an audio output terminal.

The storage 250 may store various modules for operating the display apparatus 200. In particular, a configuration of the storage 250 will be described with reference to FIG. 4.

Figure 4:
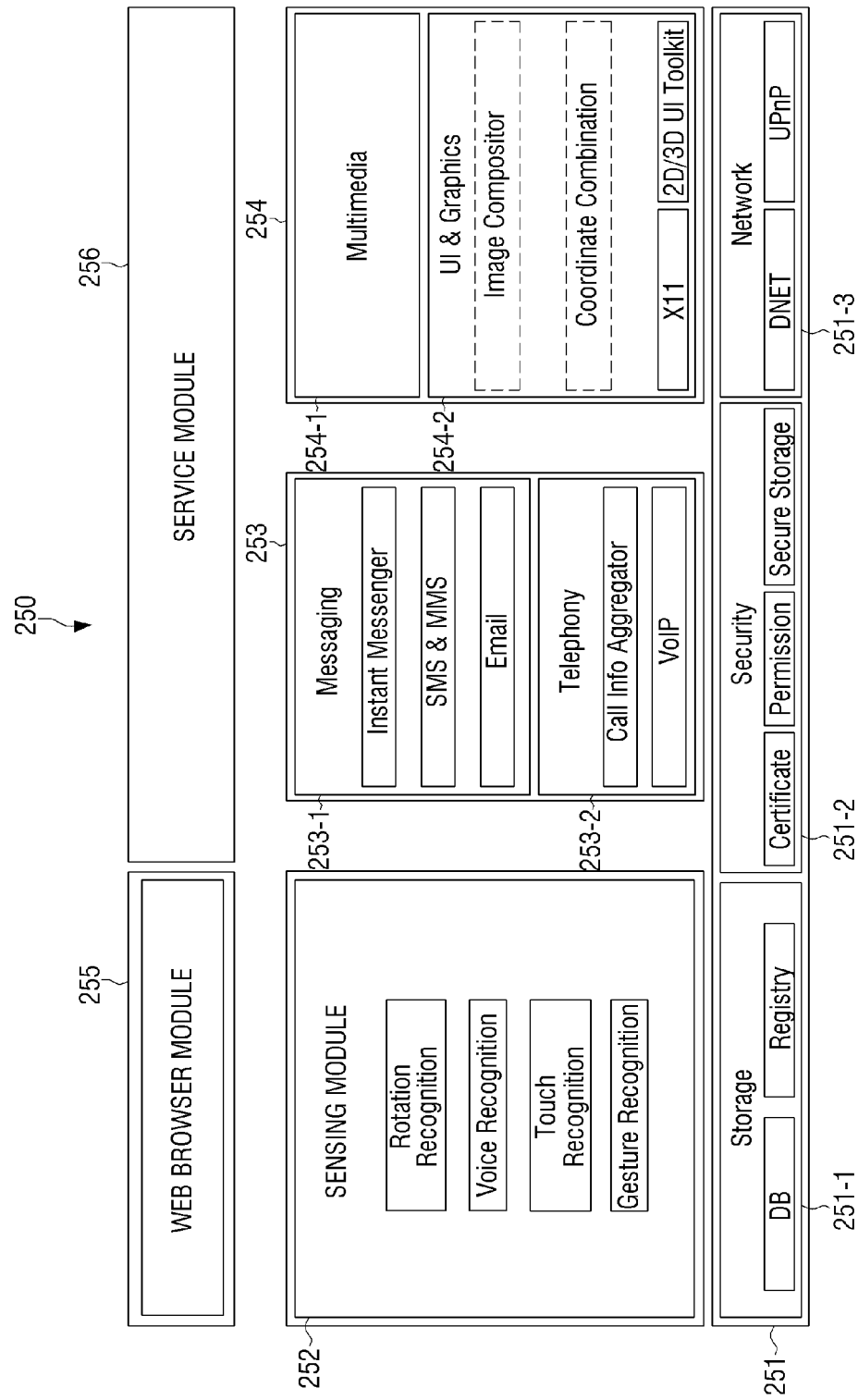
FIG. 4 is a block diagram which illustrates in detail a configuration of a storage.

FIG. 4 is a diagram which illustrates a configuration of software stored in the storage 250.

Referring to FIG. 4, software including a base module 251, a sensing module 252, a communication module 253, a presentation module 254, a web browser module 255, and a service module 256 may be stored in the storage 250.

The base module 251 may refer to a basic module configured to process signals transferred from each hardware module included in the display apparatus 200 and transfer the processed signal to an upper layer module. The base module 251 may include a storage module 251-1, a security module 251-2, a network module 251-3, etc. The storage module 251-1 may be a program module configured to manage a database DB or a registry. A main CPU 294 may read a variety of data by accessing to the database DB in the storage 250 using the storage module 251-1. The security module 251-2 may be a program module configured to support hardware certification, permission, secure storage, etc., and the network module 251-3 may be a module configured to support network connection and a distributed network (DNET) module, a universal plug-and-play (UPnP) module, etc.

The sensing module 252 may be a module configured to collect information from a variety of sensors, and analyze and manage the collected information. The sensing module 252 may include a head-direction recognition module, a face recognition module, a voice recognition module, a motion recognition module, a near-field-communication (NFC) recognition module, etc.

The communication module 253 may be a module configured to communicate with an outside. The communication module 253 may include a messaging module 253-1, such as a messenger program, a short message service (SMS) and multimedia message service (MMS) program, and email program, and a phone module 253-2, such as a Call Info Aggregator program module and a voice-over-IP (VoIP) module.

The presentation module 254 may be a module to configure a display screen. The presentation module 254 may include a multimedia module 254-1 configured to play and output multimedia content, and a UI rendering module 254-2 configured to process a UI and a graphic. The multimedia module 254-1 may include a player module, a camcorder module, a sound processing module, etc. Accordingly, the multimedia module 254-1 may perform playing a variety of pieces of multimedia content, and generating and playing screen and sound. The UI rendering module 254-2 may include an image compositor module configured to compose an image, a coordinate combination module configured to combine and generate a coordinate on a monitor on which an image is displayed, an X11 module configured to receive a variety of events from a hardware, a 2D/3D UI toolkit configured to supply a tool for configuring a 2D UI or 3D UI, etc.

The web browser module 255 may be a module configured to perform web-browsing and access to web server. The web browser module 255 may include various modules, such as a web view module configuring a web page, a download agent module configured to perform downloading, a bookmark module and a web-kit module.

The service module 256 may be a module including a variety of applications for providing various services. Specifically, the service module 256 may include various program modules, such as an SNS program, a content playing program, a game program, an e-book program, a calendar program, alarm management program and other widgets.

Although FIG. 4 illustrates a variety of program modules, some of the illustrated program modules may be omitted, modified, or added according to a type and characteristics of the display apparatus 200. For example, the display apparatus 200 may be implemented to further include a location-based module, which communicates with a GPS chip, for supporting a location-based service.

Referring again to FIG. 3, the audio processor 260 may be a component configured to process the audio data. The audio processor 260 may perform various processes, such as decoding or amplifying the audio data, and noise filtering. The audio processor 260 may include a plurality of audio processing modules configured to process audios which correspond to a plurality of pieces of content.

The video processor 270 may be a component configured to process video data which the video receiver 210 received. The video processor 270 may process various images, such as video data decoding, scaling, noise filtering, frame rate conversion, and resolution conversion. Video processor 270 may include a plurality of video processing modules configured to process videos which correspond to a plurality of pieces of content.

The user interface 280 may be configured to detect a user interaction for controlling overall operation of the display apparatus 200. In particular, the user interface 280 may detect a user interaction for controlling the plurality of screens. Specifically, the user interface 280 may detect various user interactions, such as a user interaction for moving the plurality of screens, a user interaction for changing the main screen, and a user interaction for selecting content to be played on one of the plurality of screens.

In addition, the user interface 280 may include, as shown in FIG. 3, a variety of devices for detecting interactions, such as a camera 281, microphone 282, and a remote controller signal receiver 283.

The camera 281 may be configured to capture still images or video under the control of the user. In particular, the camera 281 may capture a variety of motion of the user for controlling the display apparatus 200.

The microphone 282 may be configured to receive a user voice or other sounds to be converted to audio data. The controller 290 may use the user voice received through the microphone 282 during a call process, or convert the user voice received through the microphone 282 into audio data to be stored at the storage 250.

In response to the camera 281 and the microphone 282 being provided, the controller 290 may perform a control operation in accordance with a user voice input through a microphone 282, or a user motion recognized by the camera 281. That is, the display apparatus 200 may be operated in motion control mode or voice control mode. In response to the display apparatus 200 being operated in the motion control mode, the controller 290 may capture the user by activating the camera 281, track changes in the user motion, and perform a control operation corresponding thereto. In response to the display apparatus 200 being operated in the voice control mode, the controller 290 may be operated in voice recognition mode in which user voice input through the microphone 282 is analyzed and a control operation is performed in accordance with the analyzed user voice.

In addition, the remote controller signal receiver 283 may receive a remote controller signal from the remote controller 50 which includes a control command.

The controller 290 may control the overall operation of the display apparatus 200 using a variety of program stored in the storage 250. The controller 290, as shown in FIG. 2, may include a RAM 291, a ROM 292, a graphic processor 293, a main CPU 294, a first to nth interface 295-1 to 295-*n*, and a bus 296. In this case, the RAM 291, the ROM 292, the graphic processor 293, the main CPU 294, the first to nth interface 295-1 to 295-*n*, etc. may be connected to each other through the bus 296.

The ROM 292 may store a command set for system-booting, etc. In response to a turn-on command being input and power being supplied, the main CPU 294 may copy O/S stored in the storage 250 to the RAM 291 in accordance with a command stored in the ROM 292, and boot the system by running the 0/S. In response to the booting procedure being completed, the main CPU 294 may copy a variety of application program stored in the storage 250 to the RAM 291, and perform a variety of operations by running the application program copied to the RAM 291.

The graphic processor 293 may generate a screen including a variety of objects, such as icons, images, and text, using an operation part (not shown) and a rendering part (not shown). The operation part may calculate attribute values, such as coordinates, shape, size, and color by which each object is to be represented depending on a layout of the screen, using a control command received from the user interface 280. The rendering part may generate various screen layouts including the objects, based on the attribute value calculated in the operation part. The screen generated from the rendering part may be displayed on a display area of the display 230.

The main CPU 294 may access to the storage 250 and boot up using the 0/S stored in the storage 250. The main CPU 294 may perform various operations using a variety of programs, content, data, etc., stored in the storage 250.

The first to nth interfaces 295-1 to 295-*n* may be connected to the variety of components described above. One of interfaces may be a network interface connected to an external apparatus through a network.

Figure 5A:
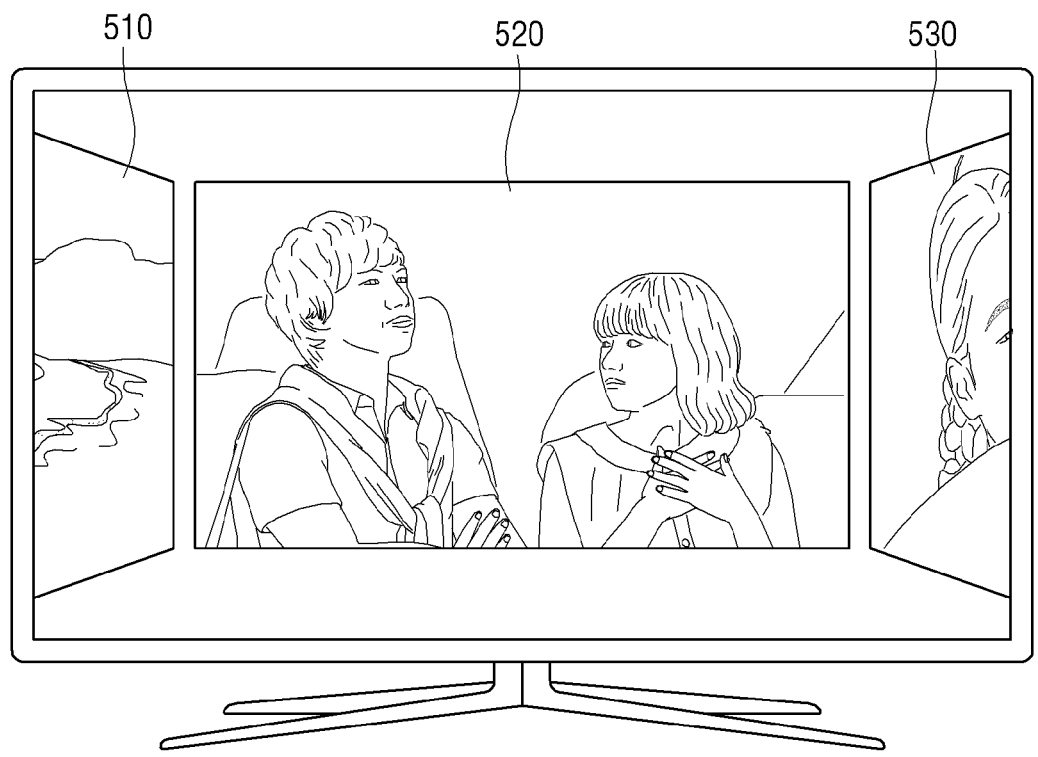
FIGS. 5A to 9C are diagrams for describing a method of moving a plurality of screens in accordance with a user interaction, according to various exemplary embodiments.

In particular, the controller 290 may control the display 230 to display a plurality of screens on the display screen in response to a preset command of a user being input. Specifically, the controller 290 may control the display 230 to display a plurality of pieces of content respectively received from the video receiver 210 on the plurality of screens. For example, the controller 290, as shown in FIG. 5A, may display a first video content received through a first tuner on the first screen 510, a second video content received through a second tuner on a second screen 520, and a third video content received through a DVD input terminal on a third screen 530. However, it is only an exemplary embodiment to display video content on a plurality of screens, and it is possible to display video images received through various video image sources on the plurality of screens. For example the controller 290 may display conference materials on the first screen 510 in response to a video conference being conducted through the display apparatus 200, and participants to the video conference on the second screen 520 and the third screen 530. In addition, the controller 290 may control the display 230 to display video content received through the tuner on the second screen 520, detailed information of the video content on the first screen 510, and shopping information related to the video content on the third screen 530.

In addition, the controller 290 may control the display 230 to display the second screen 520 as a main screen on the center area of the display screen, and the first screen 510 and the third screen 530 respectively on the left and right areas of second screen 520. Specifically, the controller 290 may set the second screen 520 which occupies the highest ratio in the display 230 as the main screen, and output an audio of the main screen through the audio output 240. Further, the controller 290 may control the display 230 to display the first screen 510 and the third screen 530 playing content for which the user is to search, respectively on the left and right areas of the second screen 520 on the display 230. In this case, audios of the first screen 510 and the third screen 530 may not be output, or have an output level lower than the preset value.

In addition, the controller 290, as shown in FIG. 5A, may control the display 230 to display the first screen 510 and the third screen 530 in trapezoid shapes respectively on the left and right areas of the second screen 520 on the display 230. In this case, the first screen 510 and the third screen 530 displayed in the trapezoid shapes may have different viewing angles from the second screen, and may be displayed as being three-dimensionally arranged in a three-dimensional space. Accordingly, the user may feel as if he/she controls the plurality of screens in the three-dimensional space.

In addition, the controller 290, as shown in FIG. 5A, may control the display 230 to display not all of the first screen 510 and the third screen 530, but a part thereof.

In addition, the controller 290 may control the display 230 to move the first to third screens 510, 520, and 530 in accordance with the user interaction detected through the user interface 280.

In this case, the user interaction detected through the user interface 280 may include a directional user interaction, and a user interaction of directly selecting one of the plurality of screens.

Hereinafter, an exemplary embodiment in which a plurality of screens move in response to a user's head rotation interaction being detected as a directional user interaction, will be described.

The controller 290, as shown in FIG. 5A, may detect whether the user's head is rotated through the camera 281, while the second screen 520 set as the main screen and the first and third screens 510 and 530 set as the plurality of subscreen are displayed on the display 230.

Figure 16:
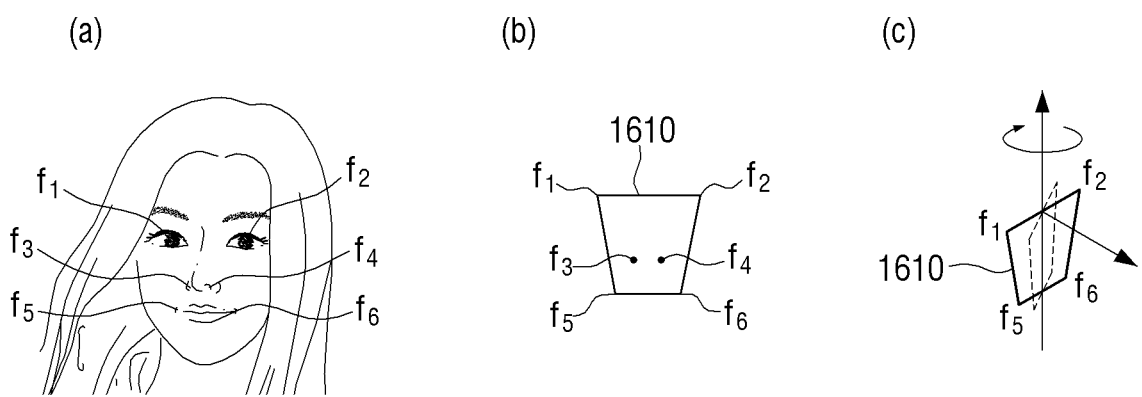
FIG. 16 is a diagram for describing a method of detecting a user's head rotation according to an exemplary embodiment.

A method of detecting the user's head rotation will be described with reference to FIG. 16. Specifically, while the camera 281 is capturing an area in which the user is located, the controller 290 may detect the user face among images captured by the camera 281. The controller 290 may then detect a plurality of feature points f1 to f6 in the user face, as shown in (a) of FIG. 16. Next, the controller 290 may generate a virtual FIG. 1610 using the detected feature points f1 to f6, as shown in (b) of FIG. 16. Next, the controller 290 may determine whether the user face rotates by determining whether the virtual FIG. 1610 changes, as shown in (c) of FIG. 16. In particular, the controller 290 may determine a direction and angle of the user's head rotation depending on changes in shape and size of the virtual FIG. 1610, as shown in (c) of FIG. 16. Meanwhile, the method of detecting the user's head rotation shown in (c) of FIG. 16 is only an exemplary embodiment, and the user's head rotation may be detected using other methods. For example, the user's head rotation may be detected using a T recognition method.

Figure 5B:
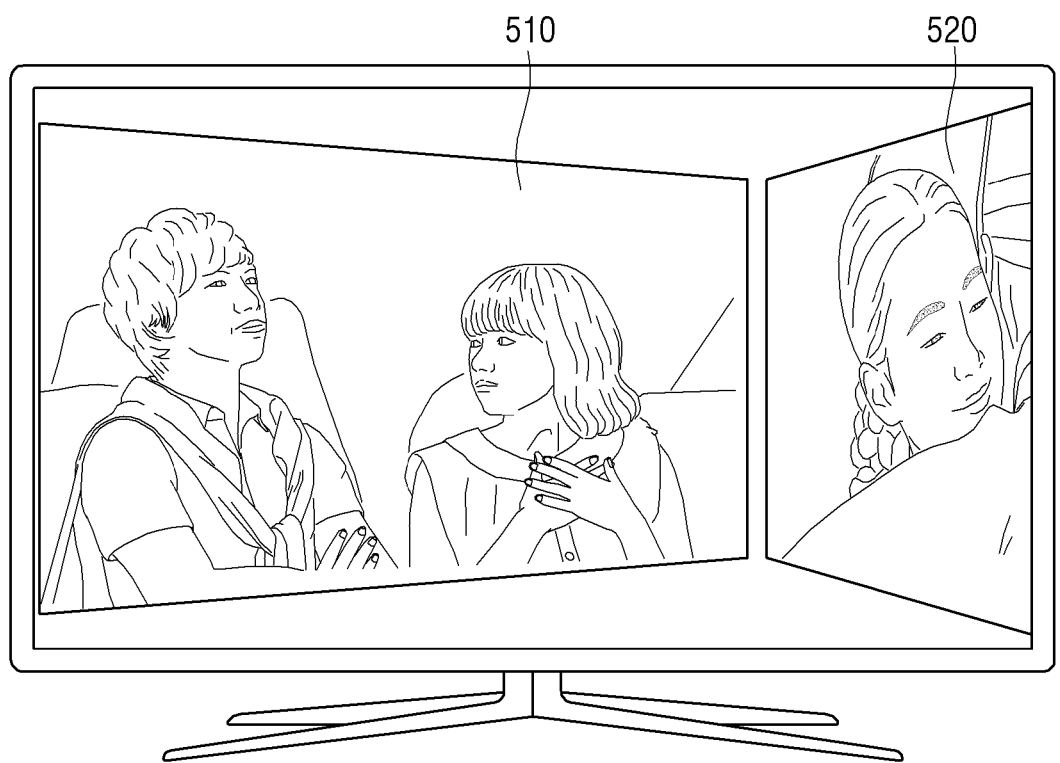

In response to the user's head rotation being detected, the controller 290 may control the display 230 to move the first to third screens 510, 520, and 530, depending on the direction of the user's head rotation. Specifically, in response to the user's head rotation in the right direction being detected through the camera 281 of the user interface 280 while the plurality of screens 510, 520, and 530 are displayed on display 230 as shown in FIG. 5A, the controller 290 may control the display 230 to move the first to third screens 510, 520, and 530 to the left. In this case, the controller 290 may control the display 230 to increase the ratio of the third screen 530 located at the far right side on the display screen, as shown in FIG. 5B.

In response to the user's head rotation in the left direction being detected through the user interface 280, the controller 290 may control the display 230 to move the first to third screens 510, 520, and 530 to the right in such a way that the ratio of the first screen 510 on the display screen increases.

In addition, the controller 290 may determine the amount of movement of the first to third screens 510, 520, and 530 depending on the detected angle of the user's head rotation, and move the first to third screens 510, 520, and 530 on a real-time basis.

Specifically, in response to a detection through the user interface 280 that the user's head rotates in the right direction by a first angle while the plurality of screens 510, 520, and 530 are displayed on display 230 as shown in FIG. 5A, the controller 290 may move the first to third screens 510, 520, and 530 to the left in such a way that the ratio of the first screen 510 on the display screen decreases, and the ratio of the third screen 530 on the display screen increases. In addition, in response to a detection through the user interface 280 that the user's head rotates in the right direction by a second angle greater than the first angle, the controller 290 may move the first to third screens 510, 520, and 530 to the left in such a way that the first screen 510 is removed from the display screen as shown in FIG. 5B, and the ratio of the third screen 530 on the display screen further increases. In addition, in response to a detection through the user interface 280 that the user's head rotates in the right direction by a third angle greater than the second angle, the controller 290 may move the second and third screens 520 and 530 to the left in such a way that the ratio of the third screen 530 on the display screen further increases than that shown in FIG. 5B, as shown in FIG. 5C.

Figure 5C:
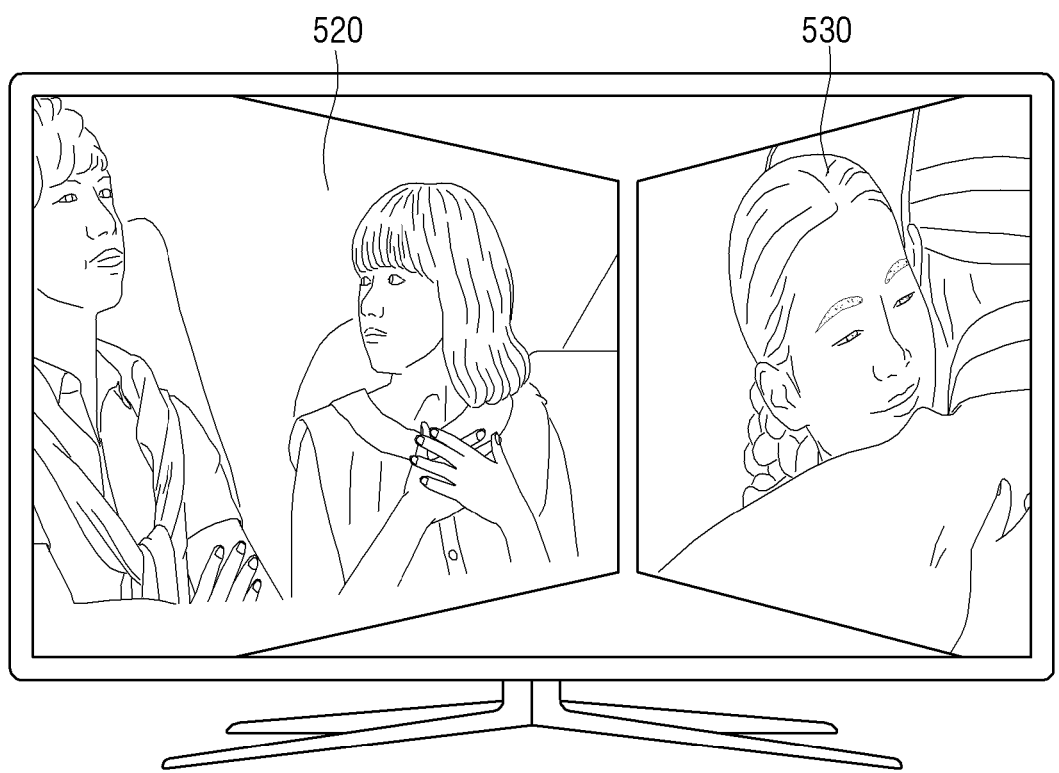
Figure 5D:
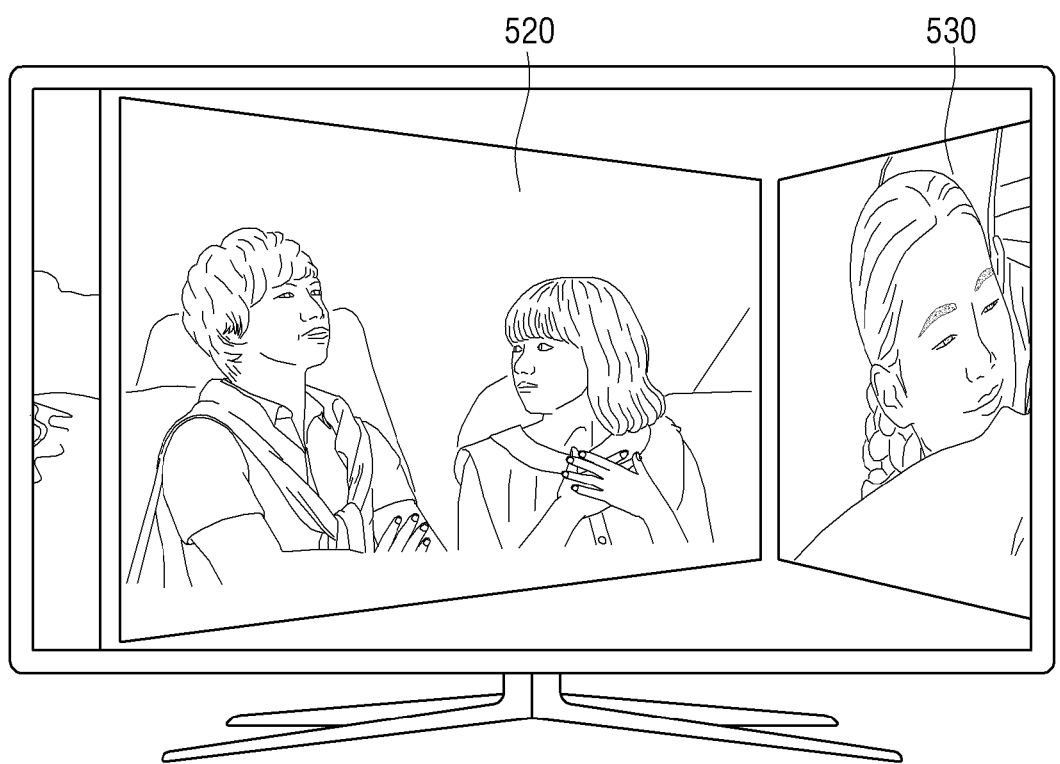
Figure 5E:
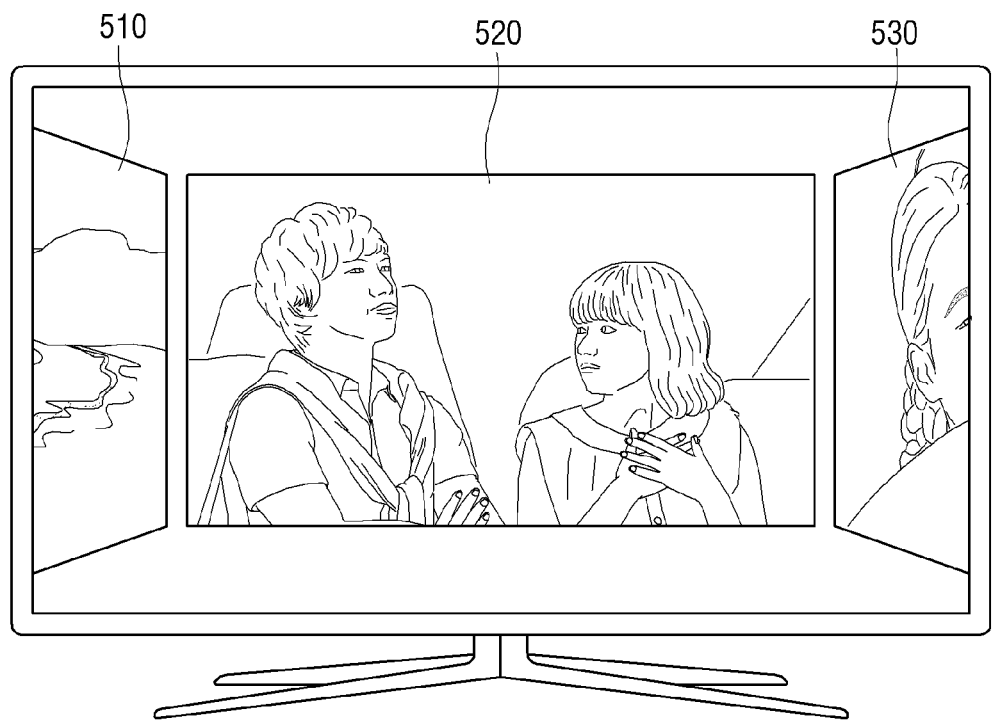

In addition, in response to a detection that the user's head rotates again in the left direction by a fourth angle while the second screen 520 and the third screen are displayed on the display screen as shown in FIG. 5C, the controller 290 may move the second screen 520 and the third screen 530 in the right direction in such a way that the ratio of the third screen 530 on the display screen decreases as shown in FIG. 5D. Further, in response to a detection that the user's head rotates again in the left direction by a fifth angle to face straight ahead while the second screen 520 and the third screen are displayed on the display screen as shown in FIG. 5D, the controller 290 may move the first to third screens 510, 520, and 530 in the right direction in such a way that the first screen 510 is displayed again on the display screen, and the ratio of the third screen 530 on the display screen decreases, as shown in FIG. 5E.

That is, as described in FIGS. 5A to 5E, the controller 290 may move the first to third screens 510, 520, and 530 depending on the direction and angle of the user's head rotation, on a real-time basis. Accordingly, since the user moves the plurality of screens in accordance with a movement of the user's head, the user may more intuitively watch content the user would like to watch.

In addition, the controller 290, when the first to third screens 510, 520, and 530 are displayed as shown in FIG. 5A, may control the audio output 240 to output only the audio of the second screen 520 which is set as a main screen. However, this is only an exemplary embodiment, and the audio output 240 may output the audios of the first screen and third screen 510 and 530, which are set as subscreens, at a lower output level than the preset value. In addition, the controller 290 may output the audio of the second screen 520, which is set as a main screen, through a speaker, and transmit the audios of the first screen and third screen 510 and 530, which are set as subscreens, to an external apparatus to be output through the external apparatus (e.g., an earphone, a mobile phone, etc.). In addition, the controller 290 may select the audio output through a user's setting. For example, in response to the user setting the audio of the first screen 510 to be output through the user interface 280, the controller 290 may control the audio output 240 to output the audio of the first screen 510 regardless of setting of the main screen.

In an exemplary embodiment, the controller 290 may control the audio output 240 to output an audio of a screen occupying the display screen at more than a first ratio, among the plurality of screens 510, 520, and 530. For example, the controller 290 may control the audio output 240 to output an audio of screens occupying the display screen at more than 20%.

In another exemplary embodiment, the controller 290 may control the audio output unit 240 to output only the audio of a screen occupying the display screen at more than a second ratio among the plurality of screens 510, 520, and 530. For example, the controller 290 may control the audio output unit 240 to output only the audio of the screen occupies the display screen at more than 70% in response to a screen occupying the display screen at more than 70%.

In still another exemplary embodiment, the controller 290 may control the audio output 240 to synthesize and output audios of the plurality of screens 510, 520, and 530 in accordance with ratios of the first to third screens 510, 520, and 530 on the display screen. For example the controller 290 may synthesize the audios in such a way that the output level of the second screen 520 is set to be three times larger than that of the first screen 510 in response to the ratio of the second screen 520 on the display screen is 60%, and the ratio of the first screen 510 on the display screen being 20%.

In addition, the controller 290 may change one of the plurality of subscreens 610 and 630 to be displayed as a new main screen by a user interaction. Specifically, the controller 290 may set a subscreen of which ratio on the display screen increases according to the direction of the user's head, as a new main screen in response to a detection that the rotation angle of the user' head is greater than the preset value. For example the controller 290 may set the third screen 630 located at the right as a new main screen in response to a detection that the rotation angle of the user' head is greater than the preset value while the user's head moves in the right direction. In addition the controller 290 may set the first screen 610 located at the left as a new main screen in response to a detection that the rotation angle of the user' head is greater than the preset value while the user's head moves in the left direction.

Figure 6A:
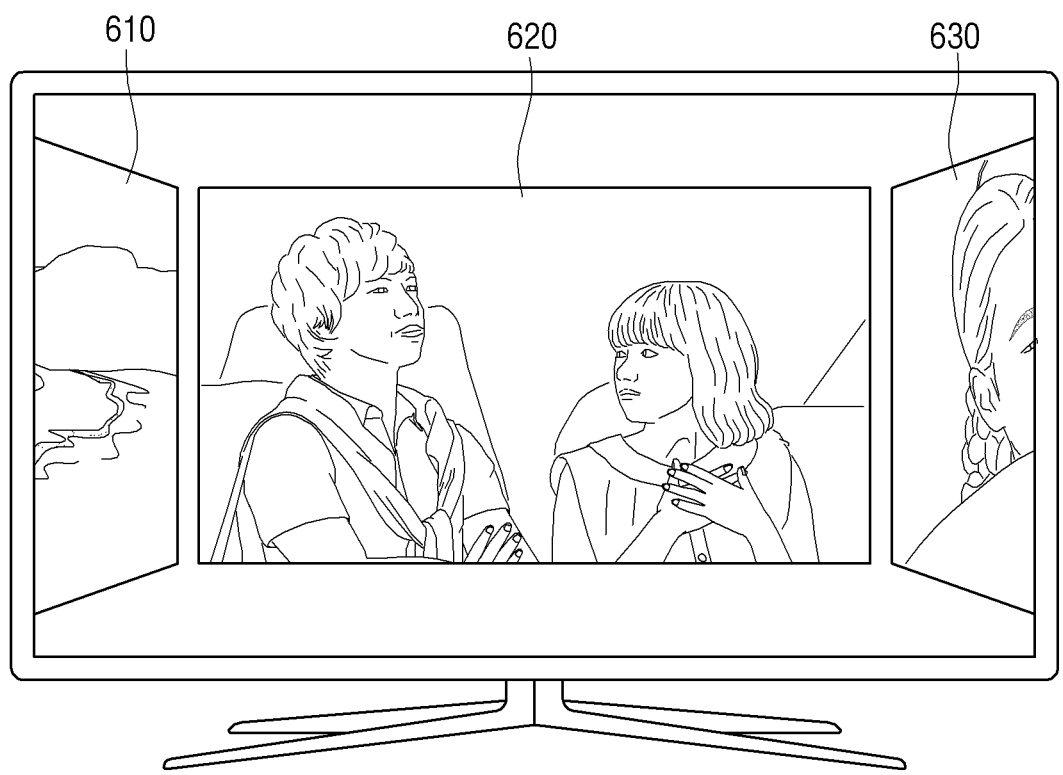
Figure 6B:
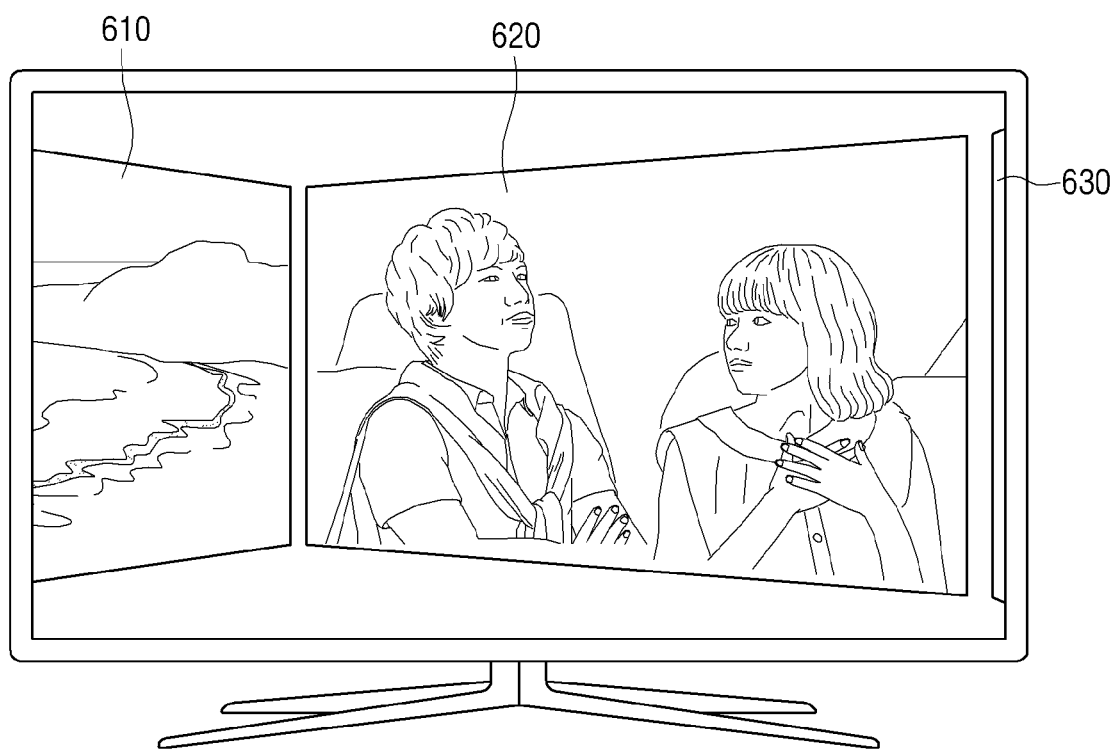
Figure 6C:
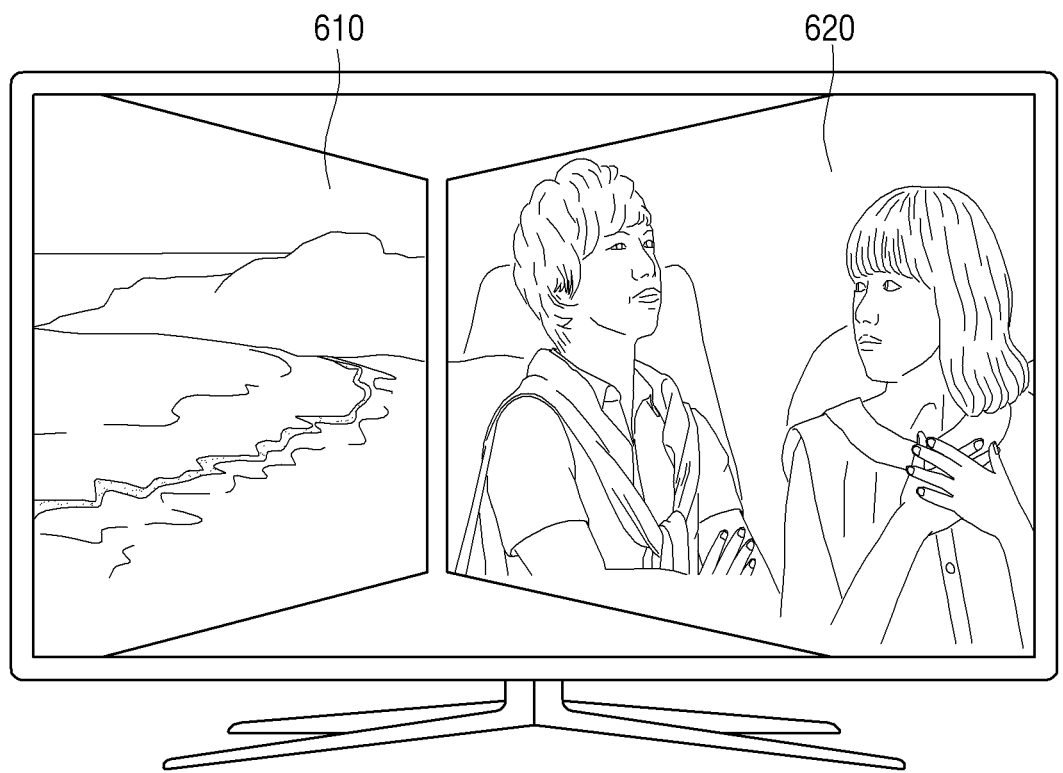

More Specifically the controller 290 may move the first to third screens 610, 620, and 630 to the right in such a way that the ratio of third screen 630 on the display screen decreases, and the ratio of the first screen 610 on the display screen increases, as shown in FIG. 6B in response to a detection that the user's head rotates in the left direction by a sixth angle while first to third screens 610, 620, and 630 are displayed as shown in FIG. 6A. In addition the controller 290 may move the first to third screens 610, 620, and 630 to the right in such a way that the third screen 630 is removed from the display screen as shown in FIG. 6C, and the ratio of the first screen 610 on the display screen further increases in response to a detection through the user interface 280 that the user's head rotates in the left direction by a seventh angle greater than the sixth angle. In response to a detection that the user's head rotates in the left direction by a eighth angle greater than a preset value, the controller 290 may move the first and second screens 610 and 620 to the right in such a way that the ratio of the first screen 610 on the display screen is greater than that of the second screen 620 on the display screen. In this case, the controller 290 may set the first screen 610 as a new main screen.

That is the controller 290 may set the first screen 610 as a new main screen in response to the ratio of the first screen 610 on the display screen becoming greater than that of the second screen 620 which is the original main screen. The controller 290 may control the audio output unit 240 to output the audio of the first screen 610 only in response to the first screen 610 being set as a new main screen.

The controller 290 may change audio output using various methods in response to the main screen being changed. For example, the controller 290 may change the audio using a fade in/out effect while the subscreen is changed into a new main screen. Specifically, the controller 290 may change the audio output by gradually increasing the audio of a subscreen which is to be changed into a new main screen, and gradually decreasing the audio of the original main screen.

Figure 6D:
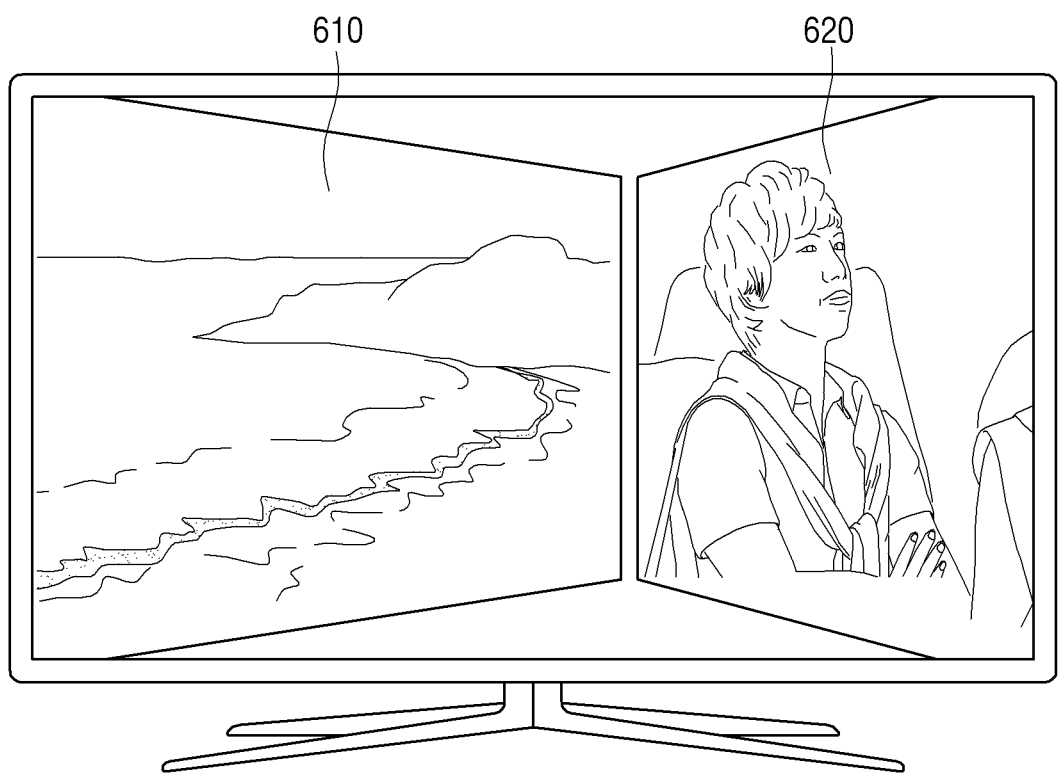

Meanwhile, although it is described in the above described exemplary embodiment that in response to the user's head rotating by a greater angle than a preset value, a subscreen in the direction of the user's head rotation may be changed into a new main screen, this is only an exemplary embodiment, and the subscreen may be changed into a new main screen using other methods. For example, the preset user interaction is input after the user rotates his/her head in a specific direction, the subscreen in the direction of the user's head rotation may be changed into a new main screen. Specifically, in response to the preset user interaction (e.g., a specific button disposed on a remote controller, eye blinking, head nodding, etc) being input after the user's head rotation in the left direction is detected while the first to third screens 610, 620, and 630 are displayed as shown in FIG. 6A, the controller 290 may move the first to third screens 610, 620, and 630 to the right in such a way that the ratio of the first screen 610 is the greatest on the display screen, as shown in FIG. 6D. In addition, the controller 290 may control the audio output 240 to output the audio of the first screen 610 by setting the first screen 610 as a new main screen.

Figure 7:
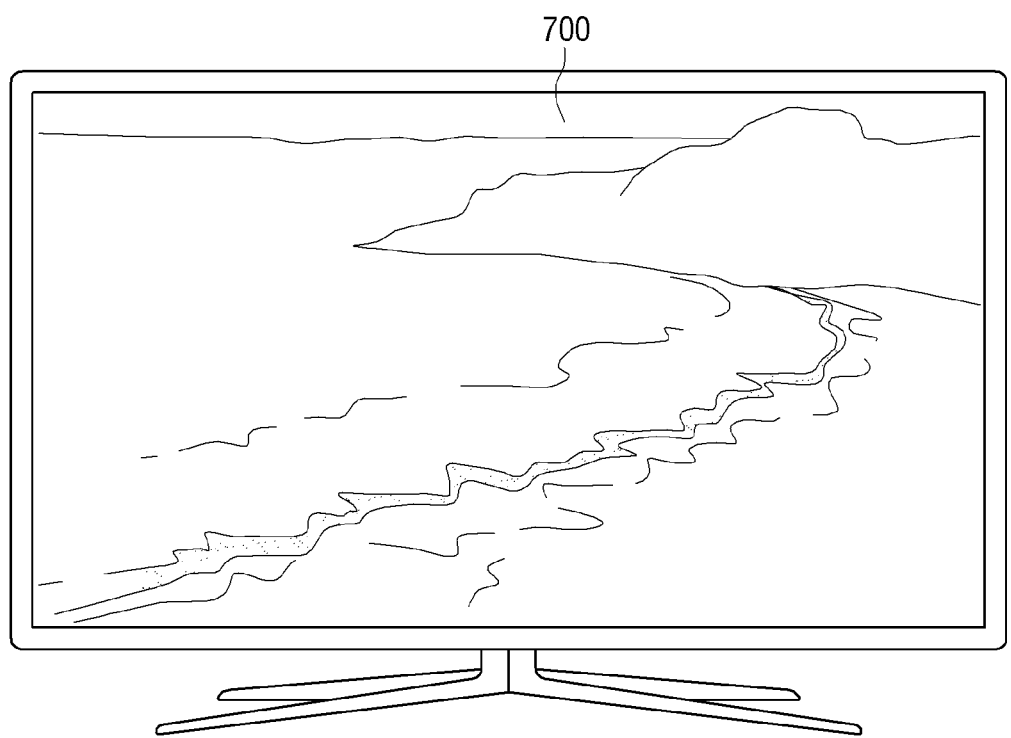

In addition, in response to the preset user command being input through the user interface 280, the controller 290 may enlarge the main screen to be displayed in a full screen. For example, in response to the preset user command (e.g., a command of selecting a screen changing button of a remote controller, etc.) being input while the first screen 610 is displayed as a new main screen as shown in FIG. 6D, the controller 290 may control the display 230 to enlarge the first screen 610 to be a full screen 700 as shown in FIG. 7.

In addition, in response to the preset user command being input through the user interface 280 while content of the first screen 610 is displayed in the full screen 700, the controller 290 may control the display 230 to be converted to a display screen in which a plurality of screens are displayed. For example, in response to the preset user command (e.g., a command of selecting a screen changing button of a remote controller, etc.) being input while the content of the first screen 610 is displayed in the full screen 700 as shown in FIG. 7, the controller 290 may control the display 230 to display the plurality of screens 610 and 620 as shown in FIG. 6D.

Although the user's head rotation interaction is described as a directional user interaction in the above described exemplary embodiment, this is only an exemplary embodiment, and it is possible to move the plurality of screens 510, 520, and 530 using other directional user interactions. For example, the display apparatus 200 may move the plurality of screens 510, 520, and 530 in accordance with the direction in which a user's eye moves, by tracking the movement of the user's eye. Specifically, in response to a detection through the camera 281 of the user interface 280 that the user's eye is in the right direction while the plurality of screens 510, 520, and 530 are displayed on the display 230 as shown in FIG. 5A, the controller 290 may control the display 230 to move the first to third screens 510, 520, and 530 to the left. In this case, the controller 290 may control the display 230 to increase the ratio of the third screen 530 located in the far right side on the display screen, as shown in FIG. 5B.

In still another exemplary embodiment, the display apparatus 200 may move the plurality of screens 510, 520, and 530 in accordance with a moving direction of a user's hand, by tracking motion of the user's hand. Specifically, in response to a detection through the camera 281 of the user interface 280 that the user's hand moves to the right while the plurality of screens 510, 520, and 530 are displayed on the display 230 as shown in FIG. 5A, the controller 290 may control the display 230 to move the first to third screens 510, 520, and 530 to the left. In this case, the controller 290 may control the display 230 to increase the ratio of the third screen 530 located in the far right side on the display screen, as shown in FIG. 5B.

In still another exemplary embodiment, the display apparatus 200 may move the plurality of screens 510, 520, and 530 in accordance with a moving direction of a pointing device by detecting the direction in which the pointing device moves. Specifically, in response to a detection that a preset button of the pointing device is selected and moved to the right while the plurality of screens 510, 520, and 530 are displayed on the display 230 as shown in FIG. 5A, the controller 290 may control the display 230 to move the first to third screens 510, 520, and 530 to the left. In this case, the controller 290 may control the display 230 to increase the ratio of the third screen 530 located in the far right side on the display screen, as shown in FIG. 5B.

As above described, since the user moves the plurality of horizontally arranged screens using a directional user interaction, the user may more intuitively select content the user would like to watch among the plurality of screens.

Figure 8A:
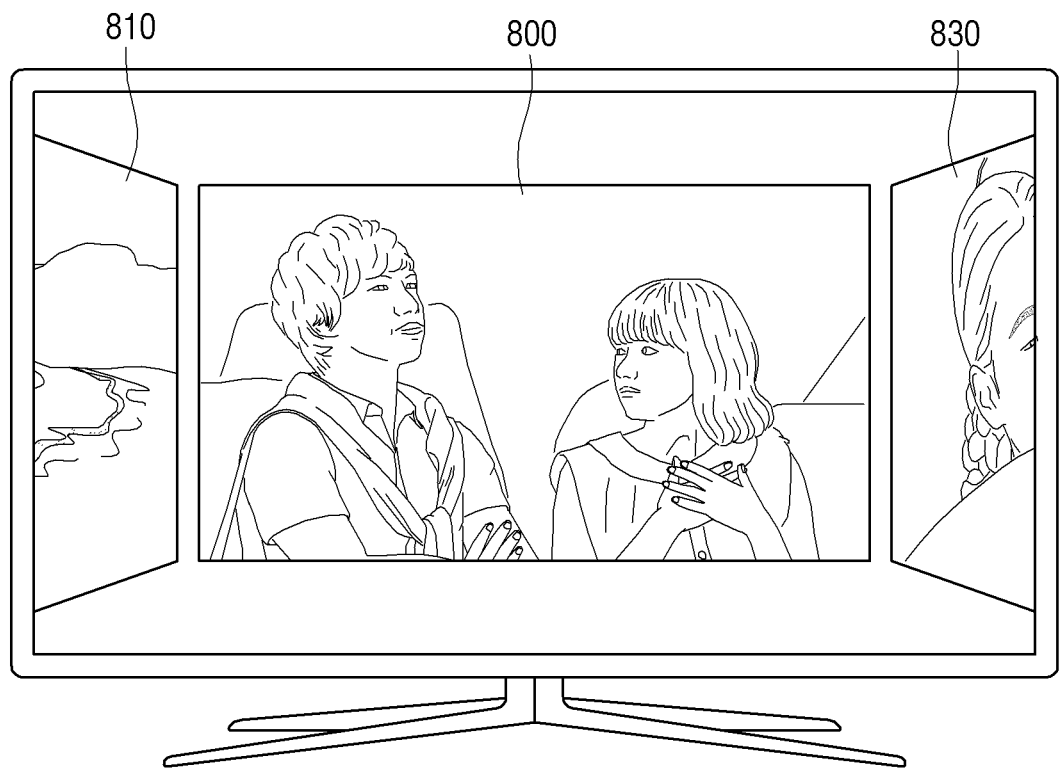
Figure 8B:
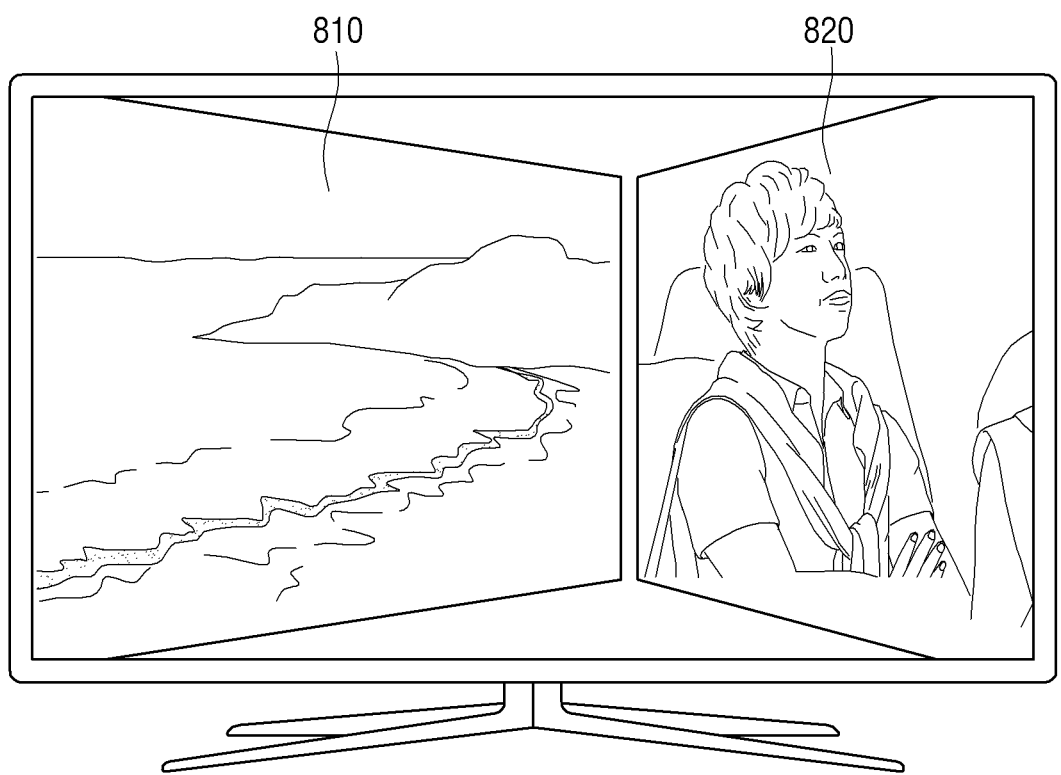

The controller 290 may directly set the subscreen as a new main screen without moving the plurality of screens on a real-time basis in accordance with a directional user interaction. For example, in response to a detection that the user's head rotates in the left direction by an angle greater than a preset value while a plurality of screens 810, 820, and 830 are displayed on the display 230 as shown in FIG. 8A, the controller 290 may move the plurality of screens 810, 820, and 830 to the right in such a way that a first screen 810 is set as a new main screen. In this case, the controller 290 may increase the ratio of the first screen 810 on the display screen to be greater than that of the second screen 820 on the display screen, as shown in FIG. 8B. In addition, the controller 290 may control the audio output 240 to output an audio of the first screen 810. That is, although the controller 290 does not move the plurality of screens 810, 820, and 830 in accordance with the user's head rotation interaction on a real-time basis, the controller 290 may directly set the original subscreen as a new main screen in accordance with the direction of head rotation in response to the head rotating more than the preset angle.

Hereinafter, a method of controlling a plurality of screens using an interaction of directly selecting one of the plurality of screens will be described.

In an exemplary embodiment, in response to the preset user interaction for controlling a plurality of screens being a user interaction of selecting one of first to third buttons, which are equipped in a remote controller, respectively corresponding to a first to third screens, and one of the first to third buttons is selected, the controller 290 may move a screen which corresponds to a selected button to the center area of the display screen to be set as a new main screen.

Specifically, in response to the first button of the remote controller corresponding to the first screen 810 is selected while the first to third screens 810, 820, and 830 are displayed as shown in FIG. 8A, the controller 290 may move the first to third screens 810, 820, and 830 to the right in such a way that the ratio of the first screen 810 on the display screen is greater than that of the second screen 820 which is the original main screen on the display screen as shown in FIG. 8B, after passing through the display screen as shown in FIGS. 6B and 6C. In addition, the controller 290 may set the first screen 810 as a new main screen, and control the audio output 240 to output the audio of the first screen 810. In response to the third button of the remote controller which corresponds to the third screen 830 is selected while the first to third screens 810, 820, and 830 are displayed as shown in FIG. 8A, the controller 290 may move the first to third screens 810, 820, and 830 to the left in such a way that the first screen 810 is removed from the display screen, and the ratio of the third screen 830 on the display screen is greater than that of the second screen 820, which is an original main screen, on the display screen. In addition, the controller 290 may set the third screen 830 as a new main screen, and control the audio output 240 to output the audio of the third screen 830.

In this case, while the subscreen is set as a new main screen, the controller 290 may change the output audio using a fade in/out effect in which the audio of the second screen 820, which is the main screen, gradually decreases and the audio of the first screen 810 or third screen 830 of which the ratio on display screen gradually increases, gradually increases.

In addition, in response to the ratio of the first screen 810 on display screen being greater than that of the second screen 820 on the display screen as shown in FIG. 8B, and the second button which corresponds to the second screen 820 among a plurality of buttons of the remote controller being selected, the controller 290 may move the first to third screens 810, 820, and 830 to the left in such a way that the ratio of the second screen 820 is the greatest on the display screen, as shown in FIG. 8A.

Although an exemplary embodiment in which the user directly selects one of the plurality of screens using the buttons on the remote controller, this is only an exemplary embodiment, and the user may directly select one of the plurality of screens using other methods. For example, it is possible to directly select one of the plurality of screens using a user voice or a pointer displayed on the display 230.

Specifically, in response to a user voice "No. 1" being input through the microphone 282 while the first to third screens 810, 820, and 830 are displayed as shown in FIG. 8A, the controller 290 may analyze the input user voice and set the first screen 810 which corresponds to the input user voice as a new main screen. In this case, indicators, for example, "No. 1" around the first screen 810, "No. 2" around the second screen 820, and "No. 3" around the third screen 830 may be displayed. Meanwhile, although the user speaks out indicators which correspond to the plurality of screens in the above-described exemplary embodiment, this is only an exemplary embodiment, and an exemplary embodiment in which the user speaks out indicators which correspond to channels played on the plurality of screens or indicators corresponding to video content may be included in the scope of the exemplary embodiments.

In addition, in response to an enter command being input after a pointer displayed on the display 230 through an external input device (e.g., a mouse, etc.) is disposed on the third screen 830 while the first to third screens 810, 820, and 830 are displayed as shown in FIG. 8A, the controller 290 may set the third screen 830 as a new main screen.

As described above, since the user directly selects a screen to be displayed as a main screen, the user may more intuitively select a screen the user would like to view among the plurality of screens.

Figure 9A:
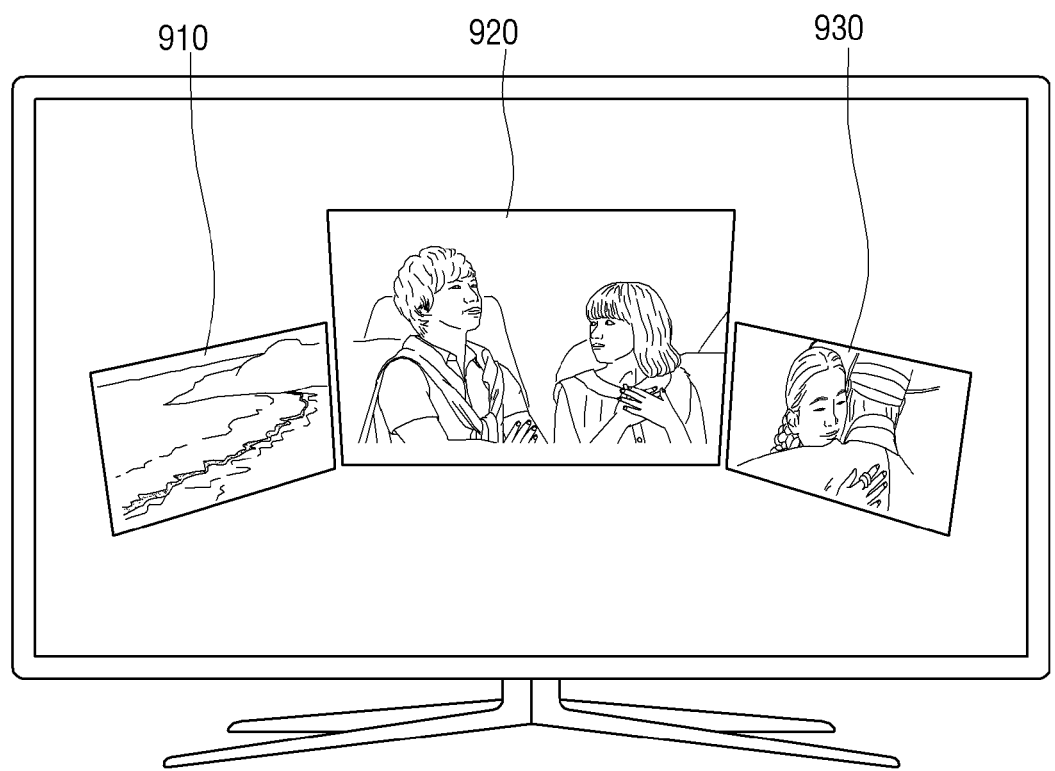

Meanwhile, although it is described that only parts of the first screen and the third screen, which are the subscreen, are displayed, this is only an exemplary embodiment, and the entirety of the first screen and third screen may be displayed. Specifically, the display apparatus 200 may display the second screen 920 set as a main screen in the center area of the display screen and the first screen 910 and third screen 930 respectively in the left and right of the main screen 920, as shown in FIG. 9A. In this case, although the size of the main screen 920 is greater than the sizes of the subscreens 910 and 930 as shown in FIG. 9A, this is only an exemplary embodiment, and the first to third screens 910, 920, and 930 may have the same size.

Figure 9B:
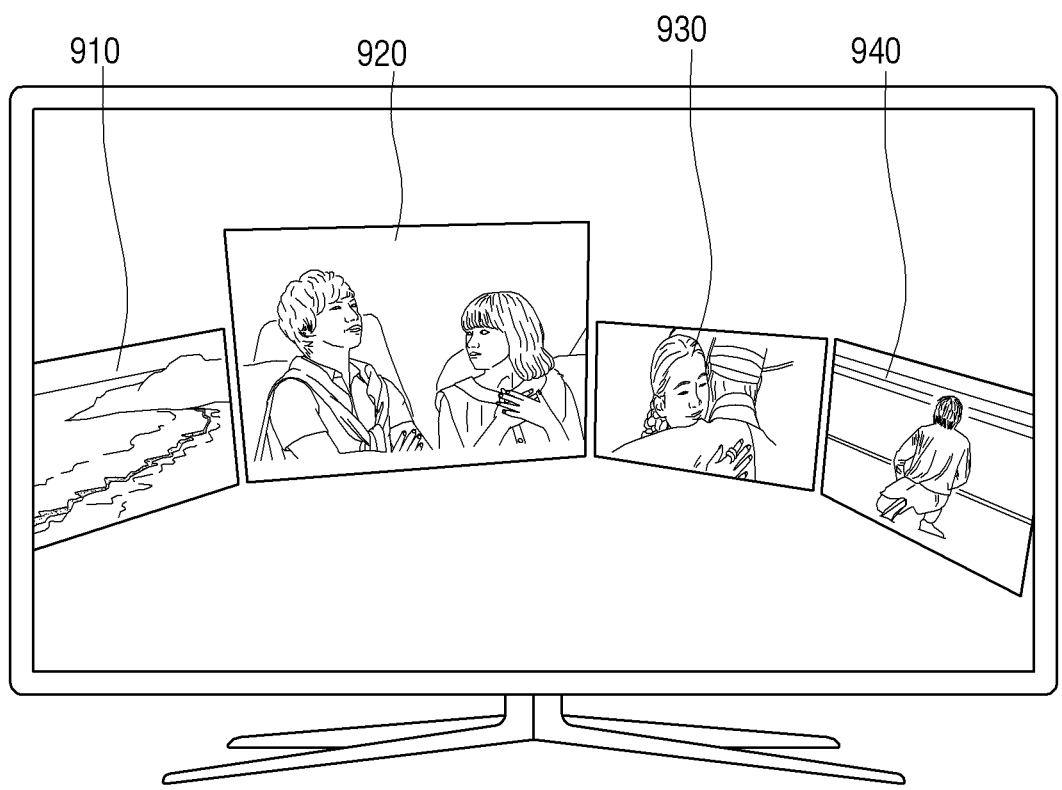
Figure 9C:
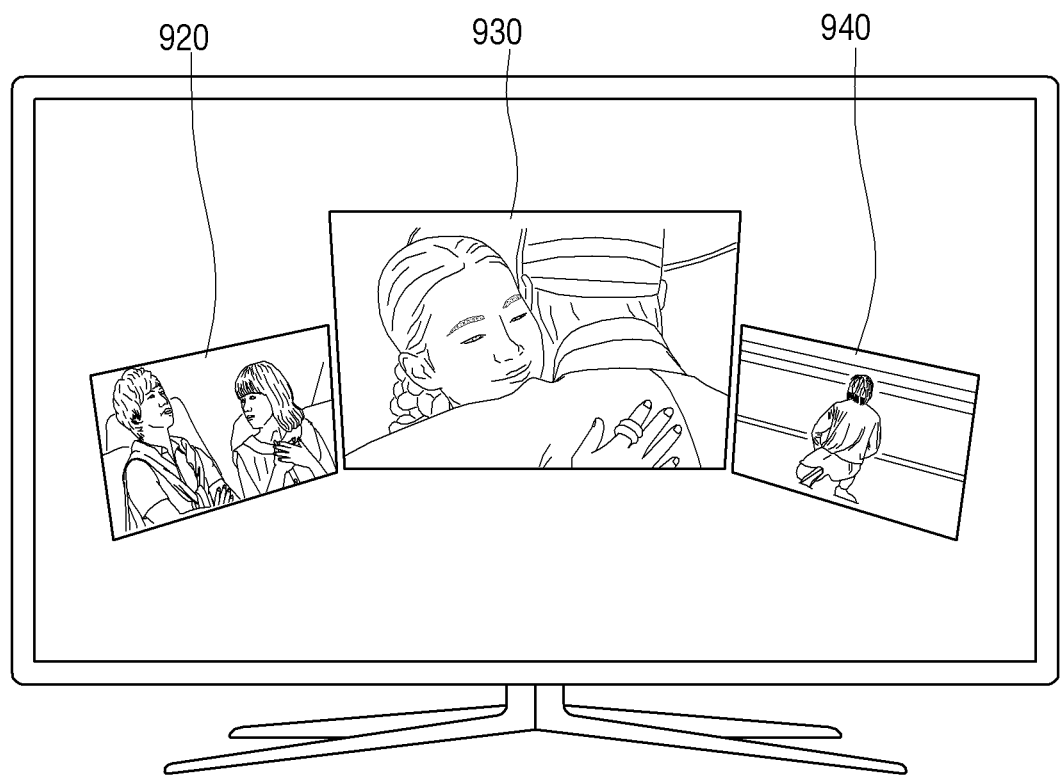

In response to a detection that the user's head rotates in the right direction while the first to third screens 910, 920, and 930 are displayed as shown in FIG. 9A, the controller 290 may control the display 230 to move the first to third screens 910, 920, and 930 to the left and display a new fourth screen 940 as shown in FIG. 9B. In addition, in response to a detection that the user's head rotates in the right direction by an angle greater than a preset value, the controller 290 may control the display 230 to remove the first screen 910 from the display screen, set the third screen 930 as a new main screen, and display the second screen 920 as a new subscreen in the left of the new main screen, and the new fourth screen 940 in the right of the new main screen as shown in FIG. 9C. In this case, the controller 290 may control the audio output 240 to output audio of the third screen 930 set as a new main screen.

Although it is described that the plurality of subscreens are arranged in the left and right directions of the main screen in the above described exemplary embodiment, this is only an exemplary embodiment, and the plurality of subscreens may be arranged in other directions. For example, the plurality of subscreen may be arranged in the up-and-down or diagonal direction of the main screen.

Figure 10A:
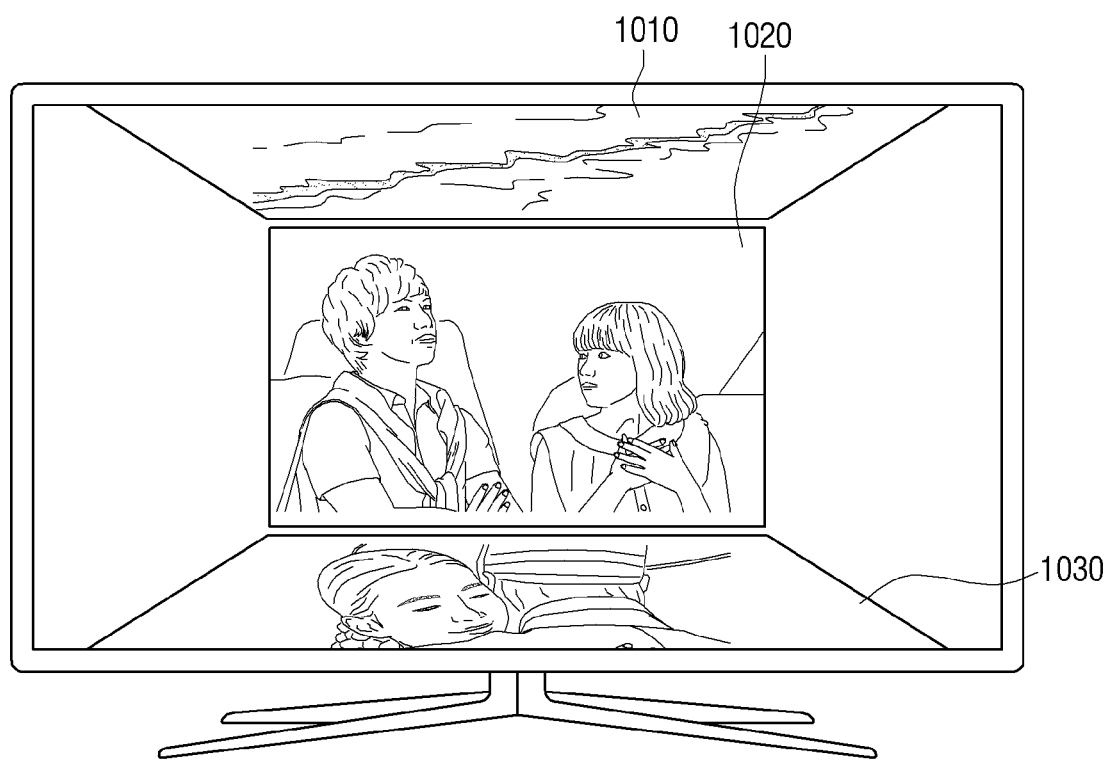
FIGS. 10A to 11 are diagrams which illustrate various configurations of a plurality of screens according to various exemplary embodiments.

Specifically, the controller 290 may control the display 230 to display a second screen 1020 set as a main screen in the center area of the display screen, a first screen 1010 in an upper direction of the second screen 1020, and a third screen 1030 in a lower direction of the second screen 1020, as shown in FIG. 10A. In this case, video content the user selects may be displayed on the second screen 1020 set as the main screen, a video including information related to the video content may be displayed on the first screen 1010, and a web browser configured to perform web surfing may be displayed on the third screen 1030.

In response to an interaction of rotation of user's head in the up-and-down direction or an interaction of button selection of the remote controller being detected while the plurality of subscreens 1010 and 1030 are displayed in the up-and-down direction of the main screen 1020 as shown in FIG. 10A, the controller 290 may set one of the first screen 1010 and the third screen 1030 as a new main screen, depending on the user interaction.

As described above, since the subscreens which provide a variety of video images in the up-and-down direction of the main screen in which video content is displayed, the user may perform multi-tasking through the display apparatus 200.

Figure 10B:
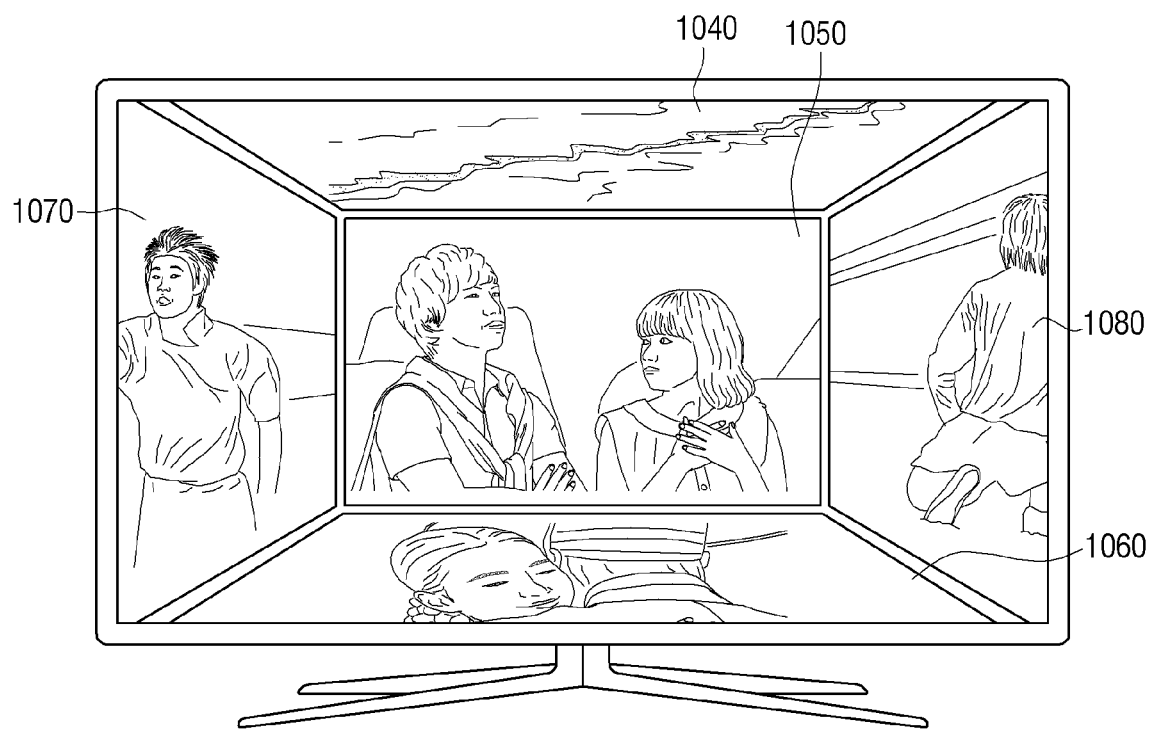

In addition, the controller 290 may control the display 230 to display a first screen 1040, a third screen 1060, a fourth screen 1070, and a fifth screen 1080 in the up-and-down and left-and-right direction of the second screen 1050 set as the main screen as shown in FIG. 10B. In this case, the controller 290 may display video content received from different video sources from the second screen 1050 on the plurality of subscreens 1070 and 1080 arranged in the left-and-right direction with respect to the second screen 1050, and provide an additional services such as a web browser or detailed information of content displayed on the main screen on the plurality of subscreens 1040 and 1060 arranged in the up-and-down direction with respect to the second screen 1050.

In addition, the controller 290, although not displayed on the display screen, may display the subscreen in the diagonal direction of the main screen. In this case, the subscreen disposed in the diagonal direction may be a screen configured to change setup of the display apparatus 200, or display really simple syndication (RSS) information such as weather reports and stock market. In addition, is response to a user interaction in the left direction being detected after a user interaction in the upper direction is detected, the controller 290 may move to a screen located in a left upper direction.

Figure 11:
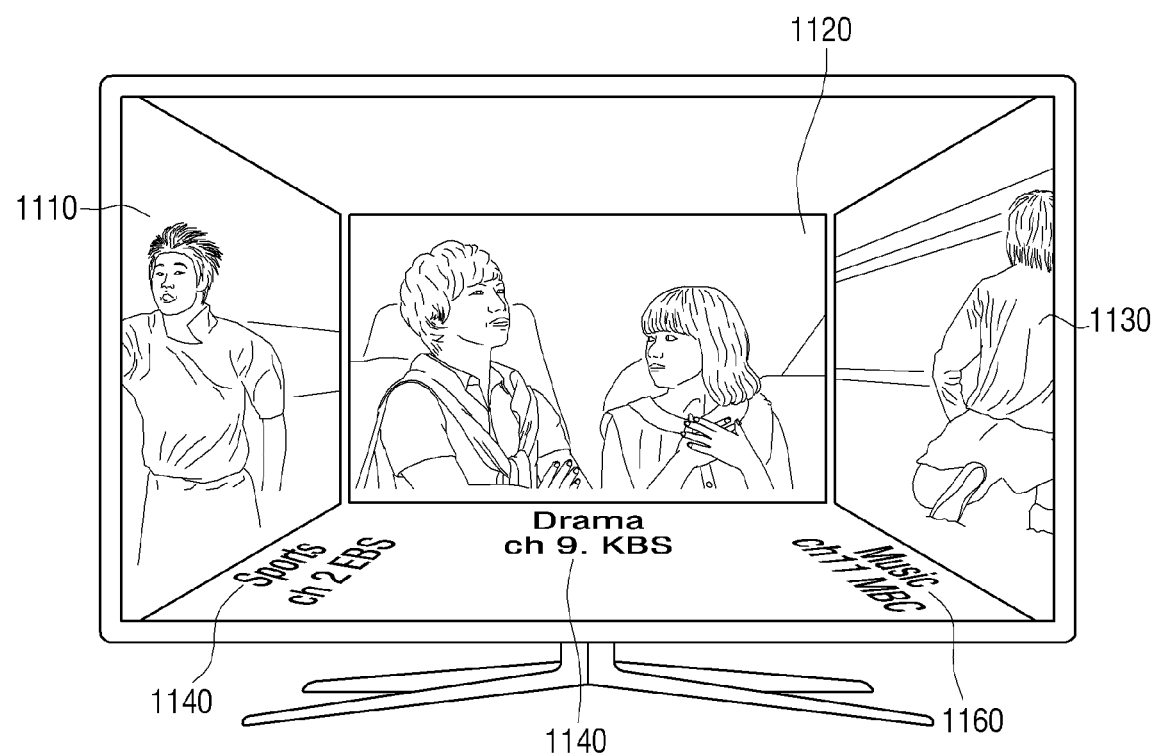

In addition, the controller 290 may display around the plurality of screens detailed information related to the content played in response to the plurality of screens being displayed. Specifically, the controller 290 may control the display 230 to display information related to the video content played on the present screens under the first to third screens 1110, 1120, and 1130, as shown in FIG. 11. In this case, information of the video content may be a variety of information, such as a title of the video content, a source (broadcast station) of the video content, a play time of the video content, etc.

Hereinafter, an exemplary embodiment will be described in more detail, with reference to FIGS. 12 to 15.

Figure 12:
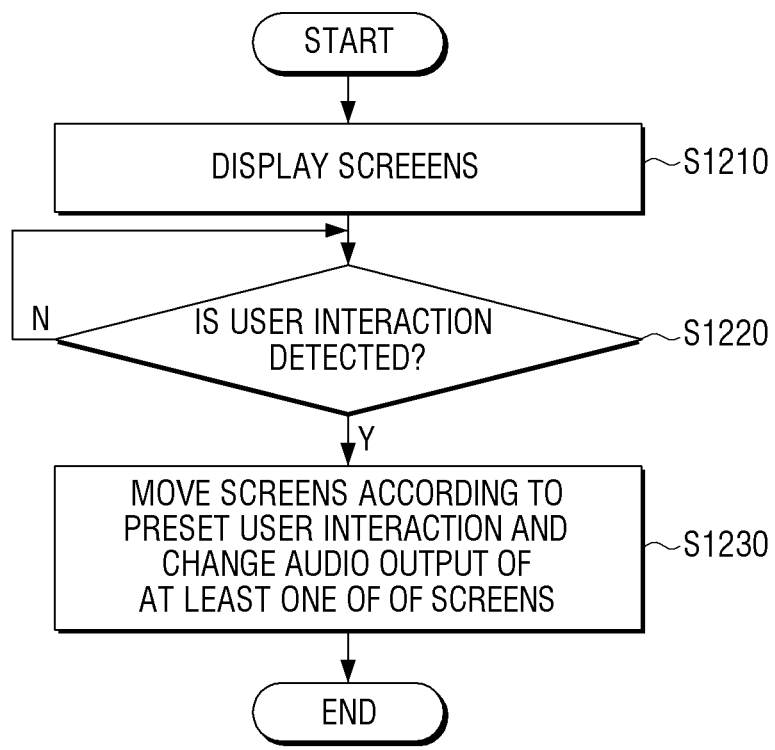
FIGS. 12 to 15 are flowcharts for describing methods of controlling a plurality of screens, according to various exemplary embodiments.

FIG. 12 is a flowchart for schematically describing a method in which a display apparatus 100 controls a plurality of screens depending on the user interaction, in accordance with an exemplary embodiment.

First, the display apparatus 100 may display the plurality of screens. Specifically, the display apparatus 100 may display a second screen set as a main screen in the center area of the display screen, and trapezoidal first and third screens in the left and right of the main screen. In this case, since the display apparatus 100 displays the trapezoidal first and third screens in the left and right of the second screen to have different viewing angles, the user may obtain an effect as if he/she were viewing the first to third screens in a three dimensional space. In addition, the display apparatus 100 may output only the audio of the second screen set as a main screen.

In addition, the display apparatus 100 may determine whether the user interaction is detected (S1220). In this case, the user interaction may be a directional user interaction, such as the user's head rotation, eye movement, hand gesture, and a pointing device, and a user interaction configured to directly select a screen, such as button selection of a remote controller and a voice command.

In response to a determination that the user interaction is detected (S1220—Y), the display apparatus 100 may move the plurality of screens depending on the user interaction, and change an audio output of at least one of the plurality of screens (S1230). Specifically, in response to the user interaction being a directional user action, the display apparatus 100 may move the first to third screens in accordance with a direction of the user interaction. In addition, in response to the user interaction being a directly selecting user interaction, the display apparatus 100 may move the first to third screens in such a way that a screen which corresponds to the user interaction being located in the center area.

In addition, the display apparatus 100 may set the original subscreen as a new main screen depending on the user interaction. Specifically, in response to the preset user interaction being a directional user interaction, and a user interaction being greater than the preset threshold value, the controller 290 may display the subscreen of which the ratio on the display screen increases according to the user interaction as a new main screen. In addition, the user interaction is a user interaction directly selecting the preset user interaction, the controller 290 may set the original subscreen which corresponds to the user interaction as a new main screen.

In response to the subscreen being changed into a new main screen, the display apparatus 100 may remove the audio of the original main screen, and output audio of the subscreen set by the user as a new main screen.

As described above, since the user moves a plurality of screens or sets a new main screen according to the user interaction, the user may more intuitively select content the user would like to watch among the plurality of pieces of content displayed on the display screen.

Figure 13:
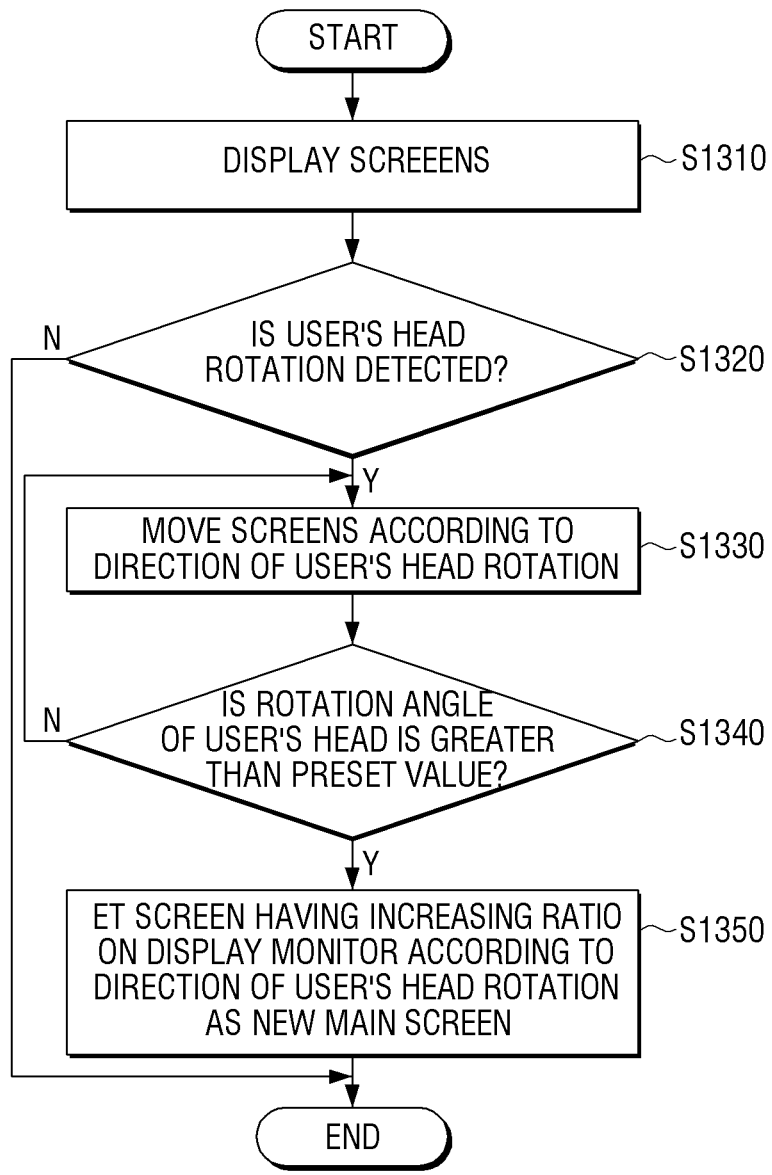

FIG. 13 is a flowchart for describing a method of controlling a plurality of screens according to the user's head rotation interaction in accordance with an exemplary embodiment.

First, the display apparatus 200 may display a plurality of screens (S1310). Specifically, the display apparatus 200 may display the second screen set as a main screen in the center area of the display screen, and trapezoidal first and third screens in left and right sides of the second screen to have different viewing angles. In addition, the display apparatus 200 may output only the audio of the second screen, which is the main screen.

Next, the display apparatus 200 may determine whether the user's head rotation is detected (S1320). In this case, since the method of detecting the user's head rotation has been described with reference to FIG. 16, detailed description thereof will be omitted.

In response to the user's head rotation being detected (S1320—Y), the display apparatus 200 may move the plurality of screens, depending on the direction of the user's head rotation (S1330). Specifically, in response to the user's head rotation in the right direction being detected, the display apparatus 200 may increase the ratio of the third screen on the display screen by moving the plurality of screens to the left. In addition, when the user's head rotation in the left direction is detected, the display apparatus 200 may increase the ratio of the first screen on the display screen by moving the plurality of screens to the right. In this case, the display apparatus 200 may determine the amount of movement of the plurality of screens in accordance with the detected angle of rotation of the user's head, and move the plurality of screens on a real-time basis.

Next, the display apparatus 200 may determine whether the rotation angle of the user' head is greater than a preset value (S1340).

In response to the rotation angle of the user' head being smaller than the preset value (S1340—N), the display apparatus 200 may continue to move the plurality of screens in accordance with the direction of the user's head rotation (S1330).

However, in response to the rotation angle of the user' head being greater than the preset value (S1340—Y), the display apparatus 200 may set a screen of which the ratio on the display screen increases in accordance with the direction of the user's head rotation as a new main screen (S1350). Specifically, the rotation angle of the user' head is greater than a preset value while the user's head moves in the right direction, the display apparatus 200 may set the third screen moved in the left direction as a new main screen. In addition, the rotation angle of the user' head is greater than a preset value while the user's head moves in the left direction, the display apparatus 200 may set the first screen moved in the right direction as a new main screen. In response to the original subscreen being changed into a new main screen, the display apparatus 200 may remove the audio output from the original main screen, and output an audio of the subscreen changed into the new main screen.

As described above, since the plurality of screens move in accordance with a movement of the user's head, the user may more intuitively control the plurality of screens without any additional input device.

Figure 14:
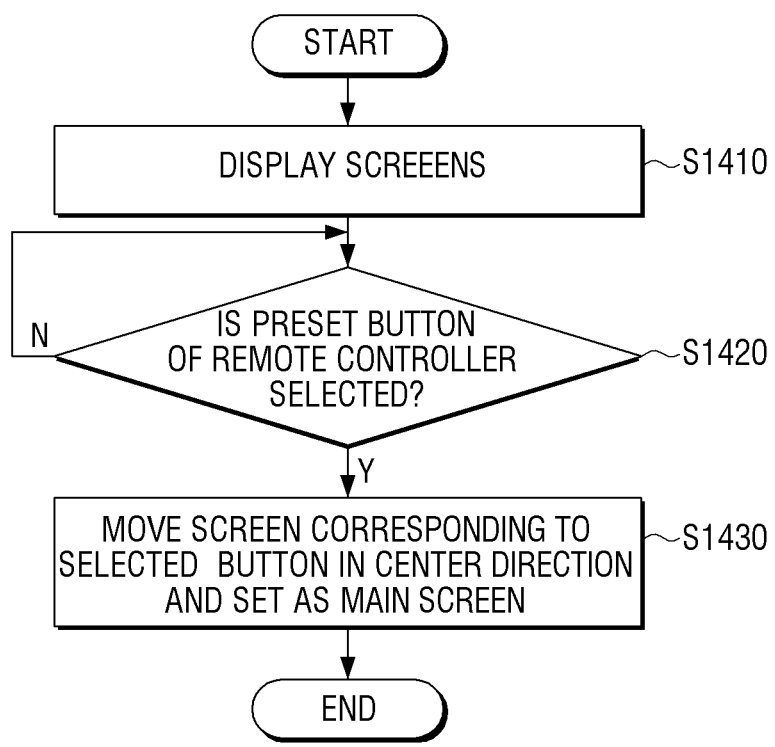

FIG. 14 is a flowchart for describing a method in which a display apparatus controls a plurality of screens using a remote controller in accordance with an exemplary embodiment.

First, the display apparatus 200 may display a plurality of screens (S1410). Specifically, the display apparatus 200 may display a second screen set as a main screen in the center area of the display screen, and trapezoidal first and third screens respectively in the left and right of the second screen to have different viewing angles. In addition, the display apparatus 200 may output only the audio of the second screen set as a main screen.

Next, the display apparatus 200 may determine whether the preset button of a remote controller is selected (S1420). In this case, the remote controller may have buttons which correspond to the plurality of screens. For example, in response to the first to third screens being displayed on the display screen, the remote controller may include a first button which corresponds to the first screen, a second button which corresponds to the second screen, and a third button which corresponds to the third screen. In this case, the first to third buttons may have the same shapes as the first to third screens. Although a remote controller 50 is described in an above exemplary embodiments, this is only an exemplary embodiment, and the remote controller 50 may be implemented in various portable devices such as a smart phone and a tablet PC.

In response to the preset button of the remote controller being selected (S1420—Y), the display apparatus 200 may move the screen which corresponds to the selected button to the center area of the display screen to be set as a main screen (S1430). Specifically, in response to the first button of the remote controller being selected, the display apparatus 200 may move the first screen which corresponds to the first button to the center area of the display screen, and set the first screen as a new main screen. In addition, in response to the third button of the remote controller being selected, the display apparatus 200 may move the third screen which corresponds to the third button to the center area of the display screen, and set the third screen as a new main screen. In response to the original subscreen being changed into a new main screen, the display apparatus 200 may remove the audio output from the original main screen, and output the audio of the subscreen which is changed into a new main screen.

As described above, since the user directly selects the screen which the user would like to view using a button of the remote controller, the user may more intuitively select content the user would like to watch among the plurality of pieces of content displayed on the plurality of screens.

Figure 15:
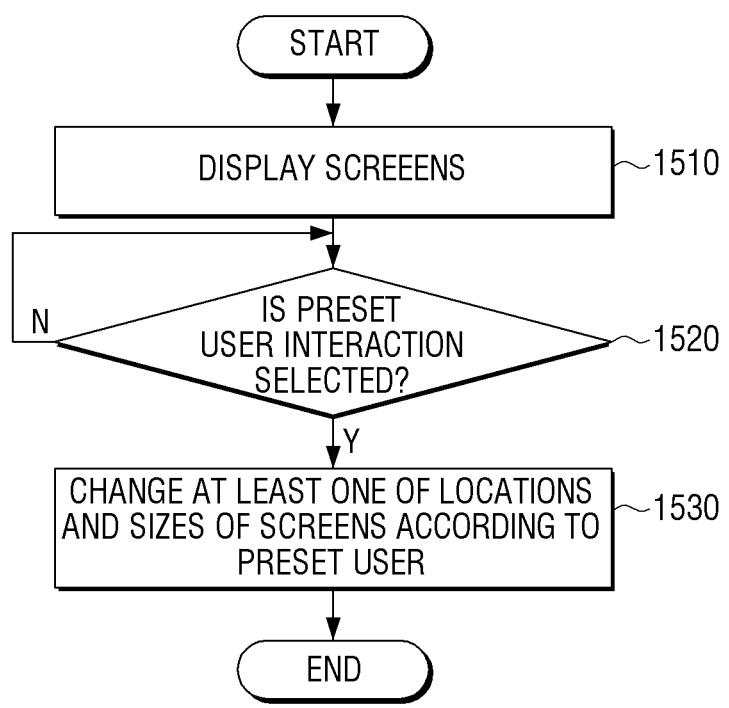

FIG. 15 is a flowchart for describing a method in which a display apparatus 100 controls a plurality of screens by a user interaction in accordance with another exemplary embodiment.

First, the display apparatus 100 may display a plurality of screens (S1510). In this case, the plurality of screens may include a main screen and a plurality of subscreens. The main screen is a screen of which the ratio is the greatest on the display screen, the display apparatus 100 may output audio of content played in the main screen.

Next, the display apparatus 100 may determine whether a preset user interaction is detected (S1520). In this case, the preset user interaction may be a directional user interaction, such as user's head rotation, eye movement, hand gesture, and a pointing device, or a user interaction in which the user directly selects a screen, such as a button selection and a voice command.

In response to the preset user interaction being detected (S1520—Y), the display apparatus 100 may change at least one of locations and sizes of the plurality of screens in accordance with the preset user interaction (S1530). Specifically, in response to the preset user interaction being a directional user interaction, the display apparatus 100 may move one of the screens to the center area according to the direction of the user interaction, and increase the size of the screen moved to the center area. In addition, in response to the preset user interaction being a user interaction which the user directly selects a screen, the display apparatus 100 may move a screen which corresponds to the user interaction to the center area, and increase the size of the screen moved to the center area.

As described above, by changing the location and size of the screen in accordance with the user interaction, the user may more intuitively and more entertainingly control the plurality of screens through a single display screen.

Figure 17:
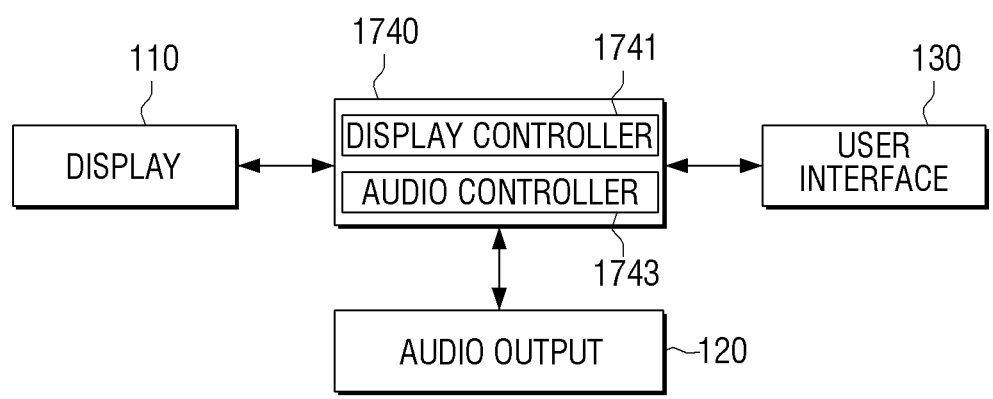
FIG. 17 is a diagram which schematically illustrates a configuration of a display apparatus according to another exemplary embodiment.

Although a single controller is implemented in the above described exemplary embodiment, this is only an exemplary embodiment, and the controller may be implemented as a plurality of controllers. As shown in FIG. 17, the controller 1740 may include a display controller 1741 and an audio controller 1743. The display controller 1741 may control overall operations of a display 1710. In particular, the display controller 1741 may control the display 1710 to move the location of the first to third screens on a display screen, in accordance with a user interaction detected through a user interface 1730. The audio controller 1743 may control the overall operation of an audio output 1720. In particular, the audio controller 1743 may control the audio output 1720 to change audio output of at least one of the first to third screens in accordance with a user interaction detected through the user interface 1730.

A program code configured to perform a control method in accordance with various exemplary embodiments may be stored in a non-transitory computer readable storage medium. The non-transitory computer readable medium may refer not to a medium which stores data for a short time, such as a register, a cache, and a memory, but a medium which semi-permanently stores data, and a medium read by a device. Specifically, the above described various applications or programs may be provided as stored in a non-transitory computer readable medium, such as a CD, a DVD, a hard disk, a Blu-ray Disc™, a USB, a memory card, and a ROM, and provided.

The foregoing exemplary embodiments and advantages are merely exemplary and are not to be construed as limiting. The present teachings can be readily applied to other types of apparatuses. In addition, the description of the exemplary embodiments is intended to be illustrative and not to limit the scope of the claims, and many alternatives, modifications, and variations will be apparent to those skilled in the art.

What is claimed is:

1. A display apparatus, the display apparatus comprising:
   a display;
   an audio output; and
   a controller configured to control the display to display a first moving image on a main screen, a second moving image on a left sub-screen, and a third moving image on a right sub-screen, and control the audio output to output audio associated with the first moving image being displayed on the main screen,
   wherein the controller is further configured to, in response to receiving user input, control the display to move the first moving image from the main screen to the left sub-screen and move the third moving image from the right sub-screen to the main screen and control the audio output to output audio associated with the third moving image being displayed on the main screen.

2. The display apparatus of claim 1, wherein the left sub-screen is disposed at a left side of the main screen and has a trapezoid shape configured to display an image thereon at a first inclined viewing angle, and
   the right sub-screen is disposed at a right side of the main screen and has a trapezoid shape configured to display an image thereon at a second inclined viewing angle different from the first inclined viewing angle.

3. The display apparatus of claim 2, wherein the controller is further configured to, in response to the user input being a user's head rotation interaction, control the display by detecting the user's head rotation and moving the first, second, and third moving images in accordance with a direction of the detected user's head rotation.

4. The display apparatus of claim 3, wherein the controller is further configured to control the display to:
   increase a ratio of the third moving image on the display which is located on a right side among the first, second, and third moving images by moving the first, second, and third moving images in a left direction in response to detecting that the user's head rotates in a right direction, and
   increase a ratio of the first moving image on the display which is located on a left side among the first, second, and third moving images by moving the first, second, and third moving images in a right direction in response to detecting that the user's head rotates in a left direction.

5. The display apparatus of claim 4, wherein the controller is further configured to perform a control operation to move the first, second, and third moving images on a real-time basis in accordance with an angle of the user's detected head rotation.

6. The display apparatus of claim 5, wherein the controller is further configured to:
   set the third moving image which is moved in a left direction as the main screen in response to detecting that the user's head rotation angle is greater than a predetermined value while the user's head moves in a right direction, and
   sets the first moving image which is moved in a right direction as the main screen in response to detecting that the user's head rotation angle is greater than the predetermined value while the user's head moves in a left direction.

7. The display apparatus of claim 2, wherein the controller is further configured to, in response to the user input being an interaction to rotate a remote controller after pressing a button on the remote controller, control the display to move a moving image which corresponds to a rotation direction of the remote controller in a direction towards a center of the display.

8. The display apparatus of claim 1, wherein the user input is received via a remote controller being moved in a first rotational direction.

9. The display apparatus of claim 8, wherein the controller is further configured to, in response to receiving another user input via moving the remote controller in a second rotational direction opposite to the first rotational direction, control the display to move the first moving image from the main screen to the right sub-screen and move the second moving image from the left sub-screen to the main screen and control the audio output to output audio associated with the second moving image being displayed on the main screen.

10. The display apparatus of claim 1, wherein the user input comprises a user gesture moving in a first rotational direction determined based on processing of images obtained via a camera.

11. The display apparatus of claim 10, wherein, the controller is further configured to, in response to receiving another user input via moving the user gesture in a second rotational direction opposite to the first rotational direction, control the display to move the first moving image from the main screen to the right sub-screen and move the second moving image from the left sub-screen to the main screen and control the audio output to output audio associated with the second moving image being displayed on the main screen.

12. The display apparatus of claim 1, wherein the controller is further configured to control the audio output to output only an audio of a moving image displayed on the main screen which takes up a largest ratio of the display, among the first, second, and third moving images.

13. The display apparatus of claim 12, wherein the controller is further configured to, in response to the user input being a user's head rotation interaction, control the audio output to increase an audio output of a moving image having a ratio on the display that increases in response to the user's head rotation being detected.

14. The display apparatus of claim 13, wherein the controller is further configured to:
   set the third moving image which is located on a right side as a new main screen and to control the audio output to output only an audio of content displayed on the third moving image in response to detecting that an angle of the user's head rotation is greater than a predetermined value while the user's head moves in a right direction, and
   set the first moving image which is located on a left side as a new main screen and to control the audio output to output only an audio of content displayed on the first moving image in response to detecting that the user's head rotation angle is greater than the predetermined value while the user's head moves in a left direction.

15. The display apparatus of claim 13, wherein the controller is further configured to control the audio output to increase an audio output of a moving image having a ratio on the display that increases, among the first, second, and third moving images, in accordance with a moving image ratio of the display.

16. The display apparatus of claim 13, wherein the controller is further configured to:
   increase an audio output of the third moving image in response to detecting that the user's head rotates in a right direction, and
   increase an audio output of the first moving image in response to detecting that the user's head rotates in a left direction.

17. The apparatus of claim 1, wherein the user input comprises a user's eye movement interaction in which a movement of the user's eye is detected.

18. The apparatus of claim 1, further comprising a storage configured to store a plurality of modules for operating the display apparatus.

19. The apparatus of claim 18, wherein the modules include at least one of a voice recognition module, a touch recognition module, and a gesture module.

20. The apparatus of claim 1, wherein the controller is further configured to control the display to display information related to the first, second, and third moving images.

21. A method for controlling a display apparatus, the method comprising:
   displaying a first moving image on a main screen, a second moving image on a left sub-screen, and a third moving image on a right sub-screen;
   outputting audio associated with the first moving image being displayed on the main screen; and
   in response to receiving user input, moving the first moving image from the main screen to the left sub-screen and moving the third moving image from the right sub-screen to the main screen, and changing the output audio to audio associated with the third moving image being displayed on the main screen.

22. The method of claim 21, wherein the left sub-screen is disposed at a left side of the main screen and has a trapezoid shape configured to display an image thereon at a first inclined viewing angle, and
   the right sub-screen is disposed at a right side of the main screen and has a trapezoid shape configured to display an image thereon at a second inclined viewing angle different from the first inclined viewing angle.

23. The method of claim 22, further comprising detecting a user's head rotation interaction as the user input, wherein the moving further comprises moving the first, second, and third moving images in accordance with a direction of the user's detected head rotation.

24. The method of claim 23, wherein the moving further comprises:
   increasing a ratio of the third moving image which is located on a right side of a display among the first, second, and third moving images by moving the first, second, and third moving images in a left direction in response to detecting that the user's head rotates in a right direction; and
   increasing a ratio of the first moving image which is located on a left side of the display among the first, second, and third moving images by moving the first, second, and third moving images in a right direction in response to detecting that the user's head rotates in a left direction.

25. The method of claim 24, wherein the moving further comprises moving the first, second, and third moving images on a real-time basis in accordance with an angle of the user's detected head rotation.

26. The method of claim 25, wherein the moving further comprises:
   determining the third moving image which is moved in a left direction as the main screen in response to detecting that the user's head rotation angle is greater than a predetermined value while the user's head moves in a right direction; and
   determining the first moving image which is moved in a right direction as the main screen in response to detecting that the user's head rotation angle is greater than the predetermined value while the user's head moves in a left direction.

27. The method of claim 21, wherein the user input is received via a remote controller being moved in a first rotational direction.

28. The method of claim 27, wherein the moving further comprises, in response to receiving another user input via moving the remote controller in a second rotational direction opposite to the first rotational direction, moving the first moving image from the main screen to the right sub-screen and moving the second moving image from the left sub-screen to the main screen, and changing the output audio to audio associated with the second moving image being displayed on the main screen.

29. The method of claim 21, wherein the user input comprises a user gesture moving in a first rotational direction determined based on processing of images obtained via a camera.

30. The method of claim 29, wherein the moving further comprises, in response to receiving another user input via moving the user gesture in a second rotational direction opposite to the first rotational direction, moving the first moving image from the main screen to the right sub-screen and moving the second moving image from the left sub-screen to the main screen, and changing the output audio to audio associated with the second moving image being displayed on the main screen.

31. The method of claim 21, wherein the changing further comprises outputting audio related to a moving image displayed on the main screen which takes up a largest ratio of a display, among the first, second, and third moving images.

32. The method of claim 31, wherein the method further comprises detecting a user's head rotation interaction as the user input, and wherein the changing further comprises increasing an audio output of a moving image having a ratio on the display that increases in accordance with a direction of the detected user's head rotation among the first, second, and third moving images.

33. The method of claim 32, wherein the changing further comprises:
increasing an audio output of a moving image in response to detecting that the user's head is rotated in a right direction, and
increasing an audio output of a moving image in response to detecting that the user's head is rotated in a left direction.

34. The method of claim 32, wherein the changing further comprises increasing an audio output of a moving image having a ratio on the display that increases in accordance with a ratio of the display, among the first, second, and third moving images.

35. The method of claim 32, wherein the changing further comprises:
determining the third moving image located on a right side among the first, second, and third moving images as a new main screen in response to detecting that the user's head rotation angle is greater than a predetermined value while the user's head moves in a right direction, and outputting an audio of content displayed on the third moving image, and
determining a first moving image located on a left side among the first, second, and third moving images as a new main screen in response to detecting that the user's head rotation angle is greater than the predetermined value while the user's head moves in a left direction, and outputting an audio of content displayed on the first moving image.

36. The method of claim 32, wherein the detecting comprises detecting a user interaction which rotates a remote controller after pressing a button on the remote controller as the user input, and
wherein the moving comprises moving a moving image which corresponds to a direction of a rotation of the remote controller in a direction towards a center of the display.

* * * * *